US012603743B2

(12) United States Patent
Fu et al.

(10) Patent No.: US 12,603,743 B2
(45) Date of Patent: Apr. 14, 2026

(54) CLOCK SYNCHRONIZATION METHOD AND RELATED APPARATUS

(71) Applicant: GUANGDONG OPPO MOBILE TELECOMMUNICATIONS CORP., LTD., Dongguan (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 461 days.

(21) Appl. No.: 17/738,829

(22) Filed: May 6, 2022

(65) Prior Publication Data

US 2022/0263629 A1     Aug. 18, 2022

Related U.S. Application Data

(63) Continuation of application No. PCT/CN2019/116818, filed on Nov. 8, 2019.

(51) Int. Cl.
*H04L 5/00*          (2006.01)
*H04W 56/00*          (2009.01)

(52) U.S. Cl.
CPC ......... *H04L 5/0051* (2013.01); *H04W 56/001* (2013.01)

(58) Field of Classification Search
CPC .............. H04L 5/0051; H04W 56/001; H04W 56/0015
USPC ....................................................... 370/336
See application file for complete search history.

(56) References Cited

U.S. PATENT DOCUMENTS

| | | | | | |
|---|---|---|---|---|---|
| 6,064,622 | A | * | 5/2000 | Lee ...................... | G11C 7/1048 |
| | | | | | 365/230.06 |
| 6,571,353 | B1 | * | 5/2003 | Sato ...................... | G11C 29/44 |
| | | | | | 714/6.32 |
| 8,730,867 | B2 | * | 5/2014 | Defrance .......... | H04W 56/0035 |
| | | | | | 370/324 |
| 11,238,420 | B2 | * | 2/2022 | Zu ...................... | G06Q 20/0855 |
| 11,700,548 | B2 | * | 7/2023 | Loehr ................... | H04W 72/52 |
| | | | | | 370/351 |
| 2005/0190001 | A1 | * | 9/2005 | Ogiso ................... | H03L 7/0995 |
| | | | | | 331/74 |

(Continued)

FOREIGN PATENT DOCUMENTS

| | | |
|---|---|---|
| CN | 102244925 A | 11/2011 |
| CN | 103138828 A | 6/2013 |

(Continued)

OTHER PUBLICATIONS

International Search Report issued in corresponding International Application No. PCT/CN2019/116818, mailed Jul. 8, 2020, 36 pages.

(Continued)

*Primary Examiner* — Thuong Nguyen
(74) *Attorney, Agent, or Firm* — BAYES PLLC

(57) ABSTRACT

Disclosed are a clock synchronization method and a related apparatus. The method comprises: a terminal receiving first clock information; determining a specific cell according to the first clock information; and taking the specific cell as a clock reference point, and performing clock synchronization according to the first clock information.

3 Claims, 12 Drawing Sheets

(56) References Cited

U.S. PATENT DOCUMENTS

| | | | | | |
|---|---|---|---|---|---|
| 2007/0047308 | A1* | 3/2007 | Mitsunaga | | G11C 16/06 |
| | | | | | 365/185.12 |
| 2011/0001525 | A1* | 1/2011 | Chung | | H03L 7/0816 |
| | | | | | 327/158 |
| 2012/0069943 | A1* | 3/2012 | Lim | | H04B 7/1851 |
| | | | | | 375/371 |
| 2013/0136055 | A1* | 5/2013 | Youssefzadeh | | H04B 7/2048 |
| | | | | | 370/324 |
| 2013/0315100 | A1* | 11/2013 | Li | | H04W 8/005 |
| | | | | | 370/254 |
| 2015/0043489 | A1* | 2/2015 | Tseng | | H04L 5/0098 |
| | | | | | 370/329 |
| 2016/0142241 | A1 | 5/2016 | Sahlin et al. | | |
| 2016/0157194 | A1 | 6/2016 | Svedman et al. | | |
| 2016/0157196 | A1* | 6/2016 | Xia | | H04W 28/04 |
| | | | | | 370/336 |
| 2016/0170382 | A1* | 6/2016 | Lobo | | G04C 11/043 |
| | | | | | 368/47 |
| 2016/0255671 | A1 | 9/2016 | Rahman et al. | | |
| 2018/0234918 | A1* | 8/2018 | Asterjadhi | | H04W 52/0216 |
| 2019/0021062 | A1 | 1/2019 | Abedini et al. | | |
| 2019/0045566 | A1 | 2/2019 | Wu | | |
| 2019/0215699 | A1 | 7/2019 | Li et al. | | |
| 2020/0372477 | A1* | 11/2020 | Zu | | G06Q 20/3829 |
| 2020/0404602 | A1 | 12/2020 | Ma et al. | | |
| 2021/0029572 | A1 | 1/2021 | Harada et al. | | |
| 2022/0141691 | A1* | 5/2022 | Takahashi | | H04W 76/15 |
| | | | | | 370/329 |
| 2022/0225461 | A1* | 7/2022 | Zhang | | H04W 76/20 |

FOREIGN PATENT DOCUMENTS

| | | | |
|---|---|---|---|
| CN | 105684514 A | 6/2016 |
| CN | 110035491 A | 7/2019 |
| WO | 2016074810 A1 | 5/2016 |
| WO | 2019137422 A1 | 7/2019 |
| WO | 2019187092 A1 | 10/2019 |

OTHER PUBLICATIONS

Written Opinion of the International Searching Authority issued in corresponding International Application PCT/CN2019/116818, mailed Jul. 8, 2020, 9 pages.

"3rd Generation Partnership Project; Technical Specification Group Services and System Aspects; System Architecture for the 5G System (5GS); Stage 2 (Release 16)", 3GPP TS 23.501 V16.2.0 (Sep. 2019), 389 pages.

"3rd Generation Partnership Project; Technical Specification Group Radio Access Network; NR; Radio Resource Control (RRC) protocol specification (Release 16)", 3GPP TS 38.331 V16.5.0 (Jun. 2021), 956 pages.

Extended European Search Report issued in corresponding European application No. 19951745.9, mailed Oct. 4, 2022.

Second Office Action issued in corresponding European application No. 19951745.9, mailed Jan. 3, 2024.

Notice of Allowance issued in corresponding Chinese application No. 202210565292.8, mailed Jan. 13, 2024.

First Office Action issued in corresponding Chinese application No. 202210565292.8, mailed Apr. 27, 2023.

First Office Action issued in corresponding European application No. 19951745.9, mailed Jul. 6, 2023.

RAN WG2, "[draft] LS on SFN handling in the dual connectivity", R2-141348, 3GPP TSG-RAN WG2 Meeting #85bis Mar. 31-Apr. 4, 2014, Valencia, Spain.

Intel Corporation, "Discussion on SFN timing difference in Dual connectivity", R4-143028, 3GPP TSG-RAN WG4 Meeting #71 Seoul, Korea, May 19-23, 2014.

Third Office Action issued in corresponding European application No. 19951745.9, mailed Jun. 27, 2024.

Communication pursuant to Article 94(3) EPC issued in corresponding European Application No. 19951745.9, mailed on Jan. 15, 2025, 11 pages.

"Support for Clock Synchronization Service", Agenda item: 11.7. 2.1, Source: Nokia, Nokia Shanghai Bell, NTT Docomo Inc., 3GPP TSG-RAN WG2 Meeting #105, R2-1900633, Athens, Greece, Feb. 25-Mar. 1, 2019, 8 pages.

Communication pursuant to Article 94(3) EPC issued in corresponding European Application No. 19951745.9, mailed Aug. 11, 2025, 11 pages.

"Remaining issues for measurement object", Source: vivo, Agenda Item: 10.4.1.4.5, 3GPP TSG-RAN WG2 Meeting, #100 R2-1712766, Reno, USA, Nov. 27-Dec. 1, 2017, 3 pages.

"Draft CR for introducing NR-DC on defintion/abbreviation, applicability and transmit timing requirements (section 3.1, 3.3, 3.6 and 7.1)", Source to WG: Samsung, 3GPP TSG-RAN WG4 Meeting #90, R4-1900705, Athens, Greece, Feb. 25-Mar. 1, 2019, 7 pages.

* cited by examiner

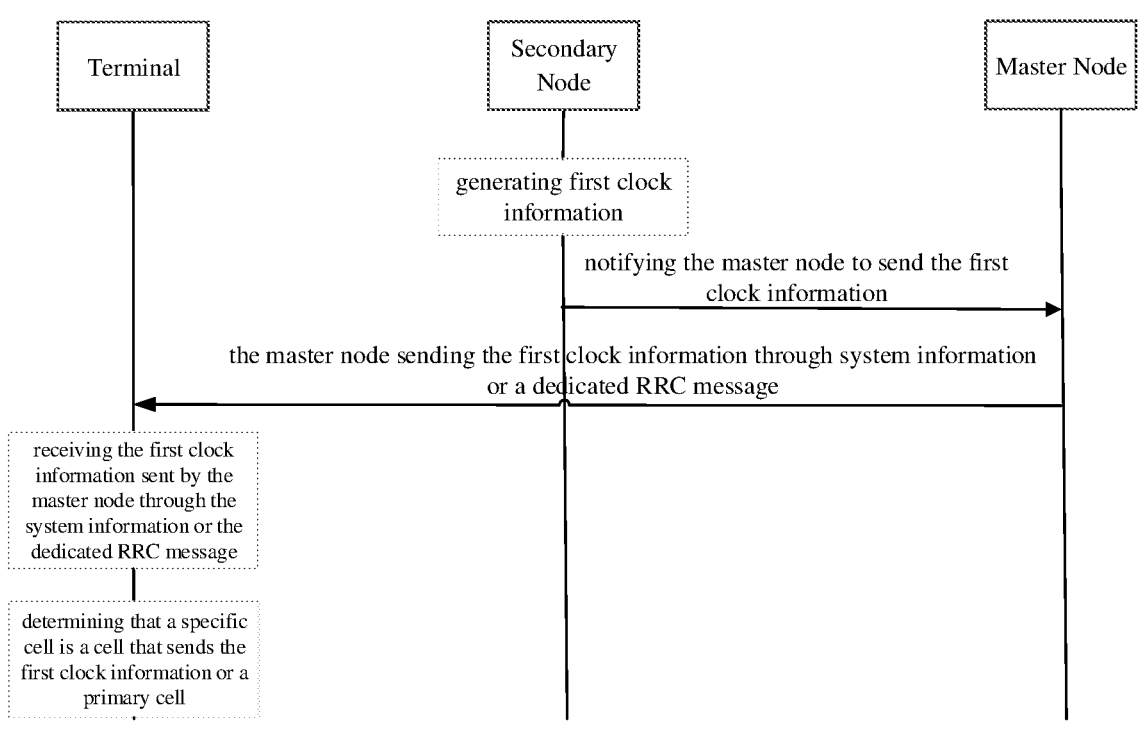

FIG. 2G

Terminal

Secondary
Node

Master Node generating first clock
information notifying the master node to send the first
clock information the master node sending the first clock information through system information
or a dedicated RRC message receiving the first clock
information sent by the
master node through the
system information or the
dedicated RRC message determining that a specific
cell is a cell that sends the
first clock information or a
primary cell

FIG. 2H

CLOCK SYNCHRONIZATION METHOD AND RELATED APPARATUS

CROSS-REFERENCE TO RELATED APPLICATIONS

This is a continuation of International Application No. PCT/CN2019/116818, entitled "CLOCK SYNCHRONIZA-TION METHOD AND RELATED APPARATUS" filed on Nov. 8, 2019, the contents of which is incorporated herein by reference in its entirety.

TECHNICAL FIELD

The present disclosure relates to the field of communica-tion technologies, and in particular, to a clock synchroniza-tion method and a related apparatus.

BACKGROUND

The 5th generation (5G) industrial internet of things (IIoT) needs to support the transmission of data for services such as factory automation, transport industry and electrical power distribution in the 5G systems. Based on transmission requirements for delay and reliability, the IIoT introduces Time Sensitive Networking (TSN). In the TSN, the 5G network may act as a TSN bridge to provide services for networks and services of the TSN.

SUMMARY

Embodiments of the present disclosure provide a clock synchronization method and a related apparatus.

In a first aspect, the embodiments of the present disclosure provide a clock synchronization method, including:

receiving at least one piece of clock information from a network device;

determining a specific cell according to the at least one piece of clock information; and using the specific cell as a clock reference point and performing clock synchronization according to the at least one piece of clock information.

In a second aspect, the embodiments of the present disclosure provide a clock synchronization method, which is applied to a network device, and the method includes:

sending first clock information to a terminal, wherein the first clock information is used for the terminal to perform the following operations: determining a spe-cific cell according to the first clock information; and using the specific cell as a clock reference point and performing clock synchronization according to the first clock information.

In a third aspect, the embodiments of the present disclo-sure provide a clock synchronization apparatus, which is applied to a terminal, and the apparatus includes a process-ing unit and a communication unit, wherein, the communication unit is configured to receive at least one piece of clock information from a network device;

the processing unit is configured to determine a specific cell according to the at least one piece of clock infor-mation; and the processing unit is further configured to use the specific cell as a clock reference point, and perform clock synchronization according to the at least one piece of clock information.

In a fourth aspect, the embodiments of the present dis-closure provide a clock synchronization apparatus, which is applied to a network device, and the apparatus includes a processing unit and a communication unit, wherein, the communication unit is configured to send first clock information to a terminal, wherein the first clock infor-mation is used for the terminal to perform the following operations: determining a specific cell according to the first clock information; and using the specific cell as a clock reference point and performing clock synchroni-zation according to the first clock information.

In a fifth aspect, the embodiments of the present disclo-sure provide a terminal, including a processor, a memory, a communication interface, and one or more programs, wherein the one or more programs are stored in the memory and configured to be executed by the processor, and the program includes instructions for executing steps in any of the methods of the first aspect of the embodiments of the present disclosure.

In a sixth aspect, the embodiments of the present disclo-sure provide a network device, including a processor, a memory, a communication interface, and one or more pro-grams, wherein the one or more programs are stored in the memory and configured to be executed by the processor, and the program includes instructions for executing steps in any of the methods of the second aspect of the embodiments of the present disclosure.

In a seventh aspect, the embodiments of the present disclosure provide a chip, including: a processor configured to call and run a computer program from a memory, to cause a device installed with the chip to perform some or all of steps described in any of the methods of the first aspect or the second aspect of the embodiments of the present disclo-sure.

In an eighth aspect, the embodiments of the present disclosure provide a computer readable storage medium, wherein the computer readable storage medium stores a computer program for electronic data exchange, and wherein the computer program causes a computer to execute some or all of steps described in any of the methods of the first aspect or the second aspect of the embodiments of the present disclosure.

In a ninth aspect, the embodiments of the present disclo-sure provide a computer program, wherein the computer program is operable to cause a computer to execute some or all of steps described in any of the methods of the first aspect or the second aspect of the embodiments of the present disclosure. The computer program may be a software instal-lation package.

BRIEF DESCRIPTION OF THE DRAWINGS

The accompanying drawings to be used in the description of embodiments or the related art will be briefly introduced below.

FIG. 2G is a schematic flowchart of determining a specific cell provided by an embodiment of the present disclosure;

FIG. 2H is a schematic flowchart of determining a specific cell provided by an embodiment of the present disclosure;

DETAILED DESCRIPTION

The technical solutions in embodiments of the present disclosure will be described below with reference to the accompanying drawings.

Based on requirements of TSN service transmission, when TSN services are transmitted in the 5G IIoT networks, the requirement for a time synchronization accuracy of 1 us needs to be met. In order to achieve the time accuracy of 1 us, a base station notifies TSN of time synchronization information and more accurate time synchronization accuracy information.

Figure 1A:
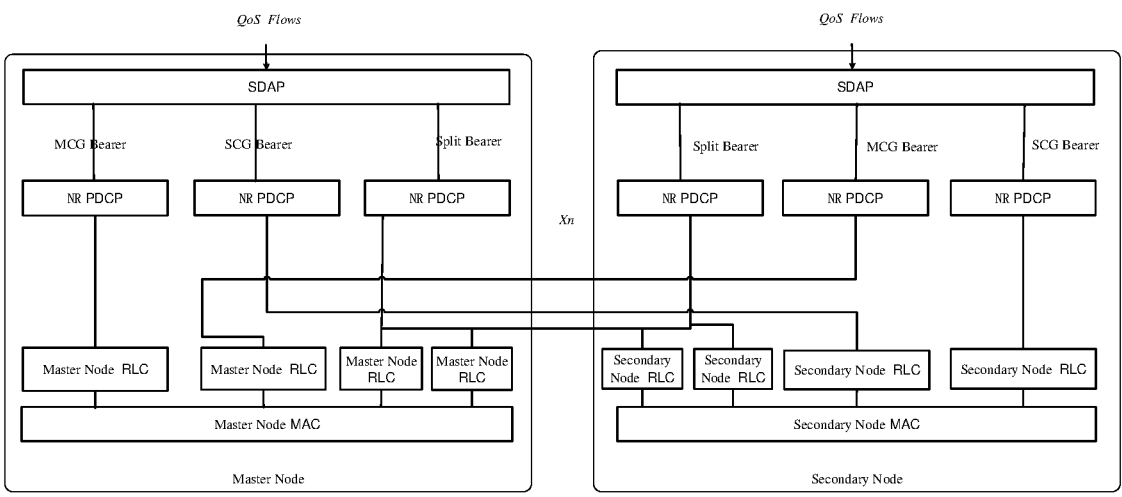
FIG. 1A is a diagram of a user plane network architecture under a dual connectivity provided by an embodiment of the present disclosure.

Reference is made to FIG. 1A, which is a diagram of a user plane network architecture under Dual Connectivity (DC) provided by an embodiment of the present disclosure. In the DC scenario, the network architecture includes a Master Cell Group (MCG) and a Secondary Cell Group (SCG), the Master Cell Group corresponds to a network device of a master node, and the Secondary Cell Group corresponds to a network device of a secondary node. Specifically, the Master Cell Group may include a primary cell and a secondary cell, and the Secondary Cell Group may include a primary secondary cell and the secondary cell, and the primary cell and the primary secondary cell may be collectively referred to as special cells. The primary cell and the secondary cell of the master node can be joined together through carrier aggregation (CA), the secondary cells of the master node can be joined together through CA, the primary secondary cell and the secondary cell of the secondary node can be joined together through CA, and the secondary cells of the secondary node can be joined together by CA.

In the CA scenario, data of a user Data Radio Bearer (DRB) is transmitted to an opposite end through a same Packet Data Convergence Protocol (PDCP) entity, a Radio Link Control (RLC) entity, different hybrid automatic repeat request (HARD) processes corresponding to a Media Access Control (MAC) entity, and different carriers.

In the DC scenario, there are a MCG bearer, a SCG bearer, and a split bearer. The MCG bearer is a bearer that is transmitted through only the MAC of the master node, the SCG bearer is a bearer that is transmitted through only the MAC of the secondary node, and the split bearer is a bearer that is transmitted through the MAC of the master node and the MAC of the secondary node. For the split bearer, specifically, data of a DRB is transmitted to the opposite end through a PDCP entity, two RLC entities respectively corresponding to the master node and the secondary node, and the MAC entity.

Figure 1B:
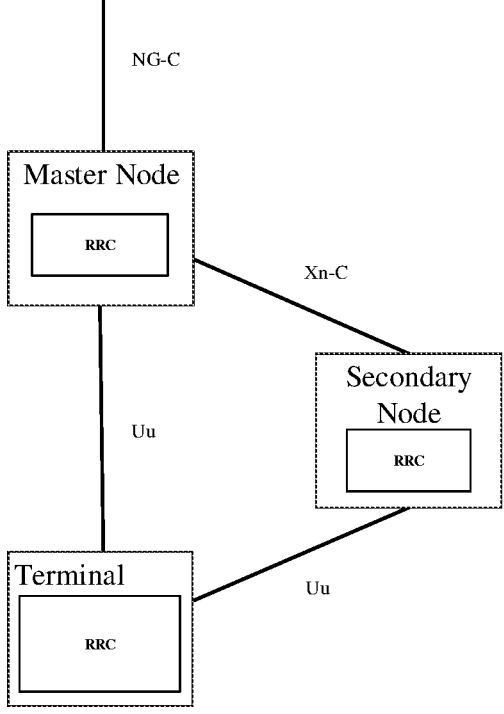
FIG. 1B is a diagram of a control plane network archi-tecture under a dual connectivity provided by an embodi-ment of the present disclosure.

Reference is made to FIG. 1B, which is a diagram of a control plane network architecture under Dual Connectivity provided by an embodiment of the present disclosure, where a terminal can be connected to the network device of the master node and the network device of the secondary node at the same time. When performing the clock synchronization, the terminal can perform the clock synchronization according to the received clock information.

For example, an end boundary of a reference system frame number in the clock information is used as a reference time point. However, it cannot determine which cell generates the reference system frame number, or which cell transmits a service data packet corresponding to the reference system frame number. In the DC scenario, frame boundaries of the master node and the secondary node may be different. In some CA scenarios, frame boundaries of the primary cell and the secondary cell may also be different. The master node or the secondary node generates the clock information, and when receiving the clock information, the terminal needs to determine which cell sent the clock information, otherwise, the synchronization between the terminal and the base station will be inaccurate due to the inconsistent understandings of the frame boundary by the terminal and the base station. Therefore, it is necessary to determine which cell is used as the reference time point corresponding to a reference clock in order to ensure accurate clock synchronization.

In view of the above problems, the embodiments of the present disclosure propose a clock synchronization method, which is not uniquely limited by the embodiments of the present disclosure.

In addition, the terminal described in the embodiments of the present disclosure may include various handheld devices, vehicle-mounted devices, wearable devices (such as smart watches, smart bracelets, pedometers, etc.), computing devices, or other processing devices connected to wireless modems, as well as various forms of user equipment (UE), mobile stations (MS) and so on that have wireless communication functions. For the convenience of description, the devices mentioned above are collectively referred to as terminals. The network device described in the embodiments of the present application includes the base stations, a core network device, or the like.

Figure 2A:
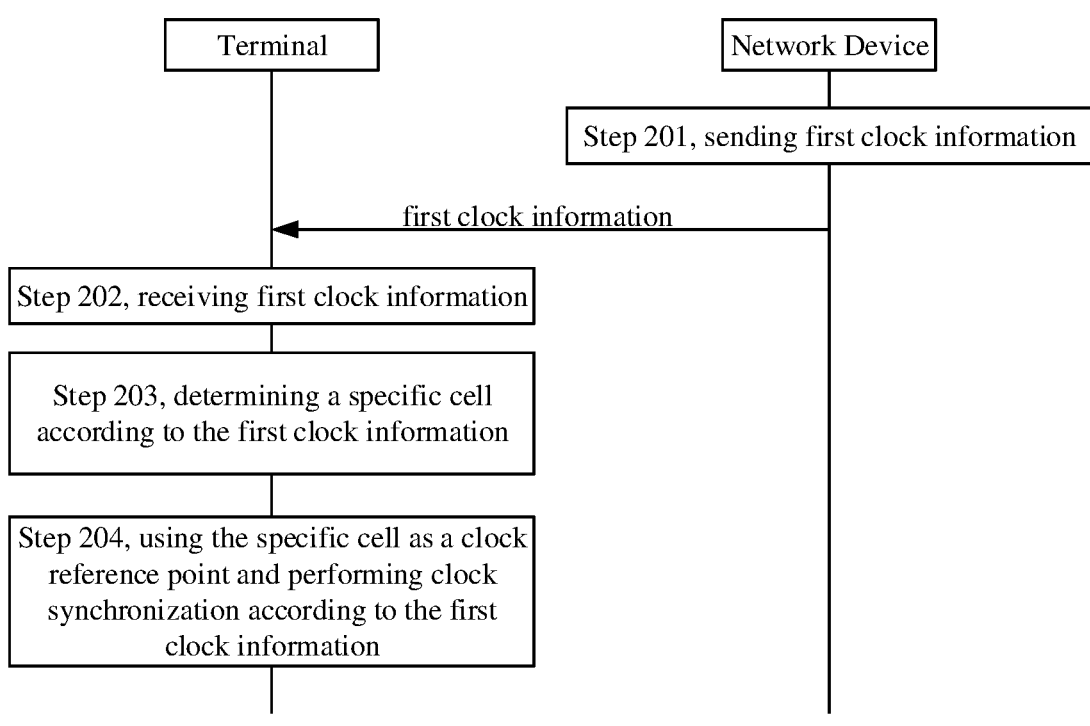
FIG. 2A is a schematic flowchart of a clock synchroni-zation method provided by an embodiment of the present disclosure.

Reference is made to FIG. 2A, which is a schematic flowchart of a clock synchronization method provided by an embodiment of the present disclosure. The method is applied to a terminal and the network architectures as shown in FIGS. 1A-1B, and includes steps 201 to 204.

In the step 201, a network device sends first clock information to the terminal.

The first clock information may include at least one piece of the following information: reference clock information, a time, an uncertainty index, a time information type, and a reference system frame number.

The first clock information may be clock information transmitted through the TSN.

If the network device is a master node, the first clock information may be sent by a primary cell or a secondary cell under the master node, and if the network device is a secondary node, the first clock information may also be sent by a primary secondary cell or a secondary cell under the secondary node.

In some embodiments, the network device is a first node in a Dual Connectivity (DC) network architecture, and the DC network architecture further includes a second node. If the first node is the master node, the second node is the secondary node; and if the first node is the secondary node, the second node is the master node.

A network device corresponding to the second node can send second clock information to the terminal, so that the terminal can perform the clock synchronization according to the first clock information and the second clock information, so as to realize the clock synchronization between the network device corresponding to the first node, the network device corresponding to the second node, and the terminal.

The second clock information may include at least one of the following information: the reference clock information, the time, the uncertainty index, the time information type, and the reference system frame number.

In the step 202, the terminal receives the first clock information from the network device.

The first clock information may be generated by the master node or the secondary node.

In a specific implementation, the terminal may acquire the first clock information generated by the master node, or the terminal may acquire the first clock information generated by the secondary node.

In some embodiments, the terminal may also receive the second clock information sent by the network device corresponding to the second node.

If the first clock information is generated by the master node, the second clock information is generated by the secondary node; and if the first clock information is generated by the secondary node, the second clock information is generated by the master node. Accordingly, the terminal may determine the specific cell according to the first clock information and the second clock information.

As can be seen, the terminal can receive the at least one piece of clock information including the first clock information, and then can determine the specific cell according to the at least one piece of clock information.

In the step 203, the terminal determines the specific cell according to the first clock information.

The specific cell is any one of the following: a primary cell, a primary secondary cell, any cell of a master node, any cell of a secondary node, or a cell that sends the clock information.

In a specific implementation, the terminal may first determine a node that generates the first clock information or a node corresponding to the first clock information, and then determine the specific cell serving as the clock reference point according to the node that generates the first clock information or the node corresponding to the first clock information.

For example, if the first clock information is generated by the master node, the terminal may determine that the specific cell is the primary cell, and then use the primary cell as the clock reference point.

The terminal may also determine a node or cell that sends the first clock information, and determine the specific cell serving as the clock reference point according to the node that generates the first clock information or the node corresponding to the first clock information, and the node or cell that sends the first clock information.

For example, if the first clock information is generated by the secondary node and sent by the master node, the terminal may determine that the specific cell is the primary secondary cell, and then use the primary secondary cell as the clock reference point.

For example, if the first clock information is generated by the secondary node and sent by the secondary node, the terminal may determine that the specific cell is the primary secondary cell, and then use the primary secondary cell as the clock reference point.

In addition, the primary cell can also be pre-defined as the clock reference point. Alternatively, it is predefined that a reference point corresponding to the clock information of the master node is the primary cell, and a reference point corresponding to the clock information of the secondary node is the primary secondary cell. Alternatively, it is predefined that a reference point of the clock information sent by the master node is the primary cell, and a reference point of the clock information sent by the secondary node is the primary secondary cell.

In the step 204, the terminal uses the specific cell as the clock reference point, and performs the clock synchronization according to the first clock information.

The terminal may perform the clock synchronization according to the reference clock information, a frame boundary of the reference system frame number, or a downlink frame boundary of the reference system frame number included in the first clock information.

As can be seen, in the embodiments of the present disclosure, the network device sends the first clock information to the terminal, and the terminal receives the first clock information sent by the network device, determines the specific cell according to the first clock information, uses the specific cell as the clock reference point, and perform the clock synchronization according to the first clock information. It can be seen that in the embodiments of the present disclosure, by determining the specific cell of the terminal serving as the clock reference point, then using the specific cell as the clock reference point, and performing the clock synchronization according to the first clock information related to the specific cell, a clock synchronization error caused by inconsistent understandings with regard to the specific cell that serves as the clock reference point by the terminal and the network device can be avoided, and the clock synchronization of the terminal and the network device is ensured.

In some embodiments, the first clock information is sent by the primary cell or the primary secondary cell.

The first clock information generated by the first node can be configured to be sent only by the primary cell or the primary secondary cell. In a specific implementation, if the first node is the master node and the first clock information is generated by the master node or the secondary node, the first clock information can be sent by the primary cell. If the first node is the secondary node and the first clock information is generated by the master node or the secondary node, the first clock information can be sent by the primary secondary cell, thereby avoiding the complexity of determining by which the first clock information is sent.

In some embodiments, receiving the first clock information may include the following steps:

receiving a system message or a dedicated radio resource control (RRC) message sent by a cell corresponding to the first node, where the system information includes the first clock information, and the dedicated radio resource control (RRC) message includes the first clock information.

A type of the system information may be any one of the following: a System Information Block (SIB) 1 or a System Information Block (SIB) 9.

A type of the dedicated radio resource control (RRC) message may be any one of the following: a Signaling Radio Bearer (SRB) 1 message, a Signaling Radio Bearer (SRB) 2 message, a Signaling Radio Bearer (SRB) 3 message or a downlink information transmission message.

In a specific implementation, if the first node is the master node, the system messages or the dedicated radio resource control (RRC) message can be sent through a cell corresponding to the master node. If the first node is the secondary node, the system messages or the dedicated radio resource control (RRC) message can be sent through a cell corresponding to the secondary node.

For example, assuming that the first node is the master node, the network device can send the SIB1 message to the terminal through the primary cell corresponding to the master node, and the terminal can receive the SIB1 message sent through the primary cell corresponding to the master node, so as to obtain the first clock information. Assuming that the first node is the secondary node, the network device can send the signaling radio bearer (SRB) 3 message to the terminal through the primary secondary cell corresponding to the secondary node, and the terminal can receive the signaling radio bearer (SRB) 3 message sent through the primary secondary cell corresponding to the primary secondary node, so as to obtain the first clock information.

In some embodiments, the terminal receives the system message or the dedicated radio resource control (RRC) message sent by a cell corresponding to the second node. The system information includes the second clock information, and the dedicated radio resource control (RRC) message includes the second clock information.

In a specific implementation, if the second node is the master node, the system messages or the dedicated radio resource control (RRC) message can be sent through the cell corresponding to the master node; and if the second node is the secondary node, the system messages or the dedicated radio resource control (RRC) message can be sent through the cell corresponding to the secondary node. In this way, the terminal can receive the system message or the dedicated radio resource control (RRC) message including the second clock information.

For example, assuming that the second node is the secondary node, the network device corresponding to the second node notifies the SIB1 message through a Common Search Space (CSS) of the system information block (SIB) 1 configured for the primary secondary cell corresponding to the second node, notifies position information of SIB9, and then sends the second clock information through the system information block (SIB) 9, so that the terminal can receive the system information block (SIB) 1 according to the CSS, and then receive the system information block (SIB) 9 including the second clock information sent by the secondary node, so as to obtain the second clock information.

As can be seen, in this example, the terminal can acquire at least one piece of clock information by receiving the system message or the dedicated radio resource control (RRC) message.

Further, the terminal may determine the specific cell according to the at least one piece of clock information. If the terminal receives the first clock information sent by the first node, the specific cell is determined according to the first clock information. Alternatively, if the terminal receives the first clock information sent by the first node and the second clock information sent by the second node, the specific cell is determined according to the first clock information and the second clock information. If the first node is the master node, the second node is the secondary node; and if the first node is the secondary node, the second node is the master node.

It can be seen that the terminal can determine the specific cell according to the at least one piece of clock information, and then use the specific cell as the clock reference point.

In some embodiments, determining the specific cell according to the first clock information may include the following steps:

if the first clock information is generated by the master node, determining that the specific cell is any one of the following: the primary cell, any cell of the master node, or a cell that sends the first clock information.

In a specific implementation, if the first clock information is generated by the master node and the first node is the master node, the first clock information is sent to the terminal by a cell corresponding to the master node, and then the terminal can determine that the specific cell is the primary cell, any cell of the master node, or the cell that sends the first clock information.

In the embodiments, the master node first generates the first clock information, and then the primary cell corresponding to the master node sends the first clock information to the terminal. Finally, the terminal receives the first clock information, and can determine that the specific cell is the primary cell, or can determine that the specific cell is the secondary cell of the master node.

In the embodiments, the master node generates the first clock information, and the secondary cell corresponding to the master node sends the first clock information to the terminal; the terminal receives the first clock information and can determine that the specific cell is the primary cell, or the terminal can determine the specific cell is the secondary cell corresponding to the master node.

If the first clock information is generated by the master node and the first node is the secondary node, the first clock information is sent to the terminal by the cell corresponding to the secondary node, and the terminal can determine that the specific cell is the primary cell, any cell of the master node or the cell that sends the first clock information.

In the embodiments, the master node generates the first clock information, and notifies the secondary cell corresponding to the secondary node to send the first clock information. The primary secondary cell corresponding to the secondary node sends the first clock information to the terminal, and the terminal receives the first clock information, and can determine that the specific cell is the primary cell, or the terminal can determine that the specific cell is the secondary cell of the master node, or the terminal can determine that the specific cell is the primary secondary cell.

In the embodiments, the master node generates the first clock information and notifies the primary secondary cell corresponding to the secondary node to send the first clock information. The secondary cell corresponding to the secondary node sends the first clock information to the terminal, the terminal receives the first clock information and can determine that the specific cell is the primary cell, or the terminal can determine that the specific cell is the secondary cell of the master node, or the terminal can determine that the specific cell is the secondary cell corresponding to the secondary node.

It can be seen that by setting that it is determined that the specific cell is the master cell, any cell of the master node, or the cell that sends the first clock information when it is determined that the first clock information is generated by the master node, the specific cell of the clock reference point determined by the terminal and the specific cell of the clock reference point determined by the network device can be consistent, thereby realizing the clock synchronization between the terminal and the network device.

In addition, in a case where it is determined that the first clock information is sent by the master node, it can also determine that the specific cell is the primary cell, any cell of the master node, or the cell that sends the first clock information, so that the specific cell of the clock reference point determined by the terminal and the specific cell of the clock reference point determined by the network device can be consistent, thereby realizing the clock synchronization between the terminal and the network device, which will not be repeated here.

Optionally, in a case where a sending node that sends the first clock information and a generating node that generates the first clock information are inconsistent, the sending node may update or modify the first clock information generated by the generating node.

In some embodiments, determining, by the terminal, the specific cell according to the first clock information may include the following steps:

if the first clock information is generated by the secondary node or corresponds to the secondary node, determining, by the terminal, that the specific cell is the primary secondary cell or the cell that sends the first clock information.

The first clock information corresponding to the secondary node means that a service data packet corresponding to the first clock information is sent by the secondary node.

Figure 2B:
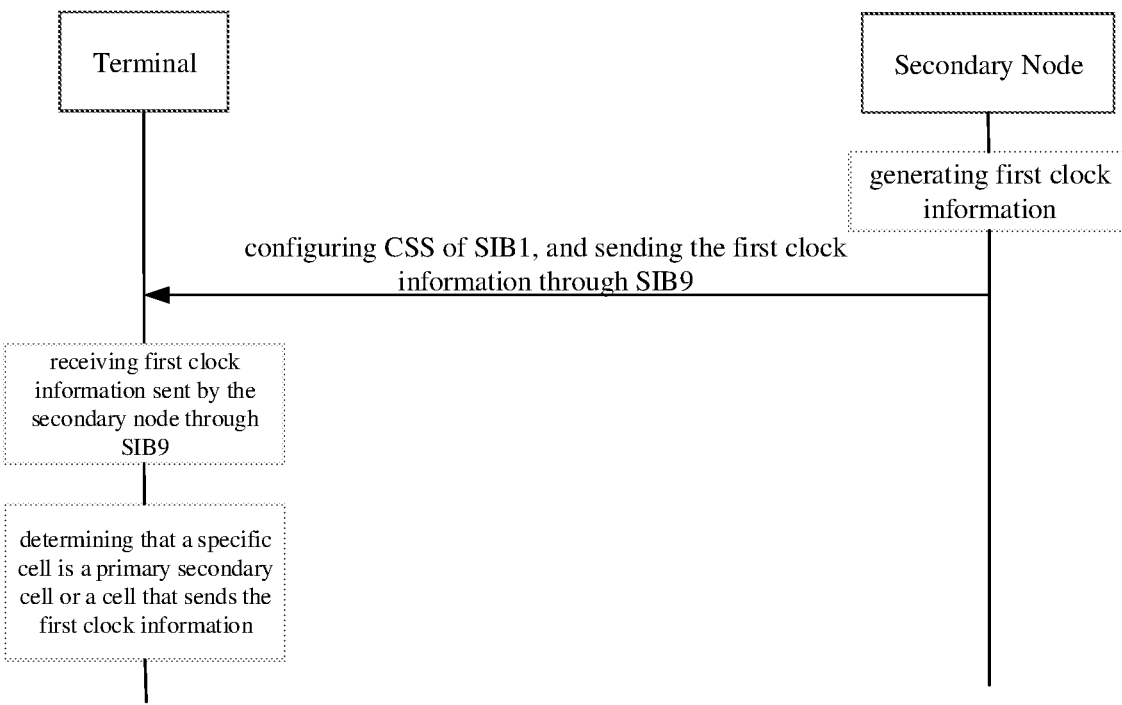
FIG. 2B is a schematic flowchart of determining a specific cell provided by an embodiment of the present disclosure.

In a specific implementation, if the first clock information is generated by the secondary node or corresponds to the secondary node, and the first node is the secondary node, the first clock information is sent to the terminal by the cell corresponding to the secondary node, and then the terminal can determine that the specific cell is the primary secondary cell or the cell that sends the first clock information. As an example shown in FIG. 2B, FIG. 2B is another schematic flowchart of determining a specific cell provided by an embodiment of the present disclosure. As shown in FIG. 2B, the network device corresponds to the first node, the first node is the secondary node, and the secondary node generates the first clock information. The secondary node can configure the CSS of SIB1, and sends the first clock information to the terminal through the SIB9. The terminal receives the first clock information sent by the secondary node through the SIB9, and then the terminal can determine that the specific cell is the primary secondary cell or the cell that sends the first clock information.

In the embodiments, the secondary node generates the first clock information; the primary secondary cell corresponding to the secondary node send the first clock information to the terminal, and the terminal receives the first clock information and can determine that the specific cell is the primary secondary cell.

In the embodiments, the secondary node generates the first clock information; the secondary cell corresponding to the secondary node sends the first clock information to the terminal; and the terminal receives the first clock information and can determine that the specific cell is the primary secondary cell, or the terminal can determine the specific cell is the secondary cell of the secondary node.

Figure 2C:
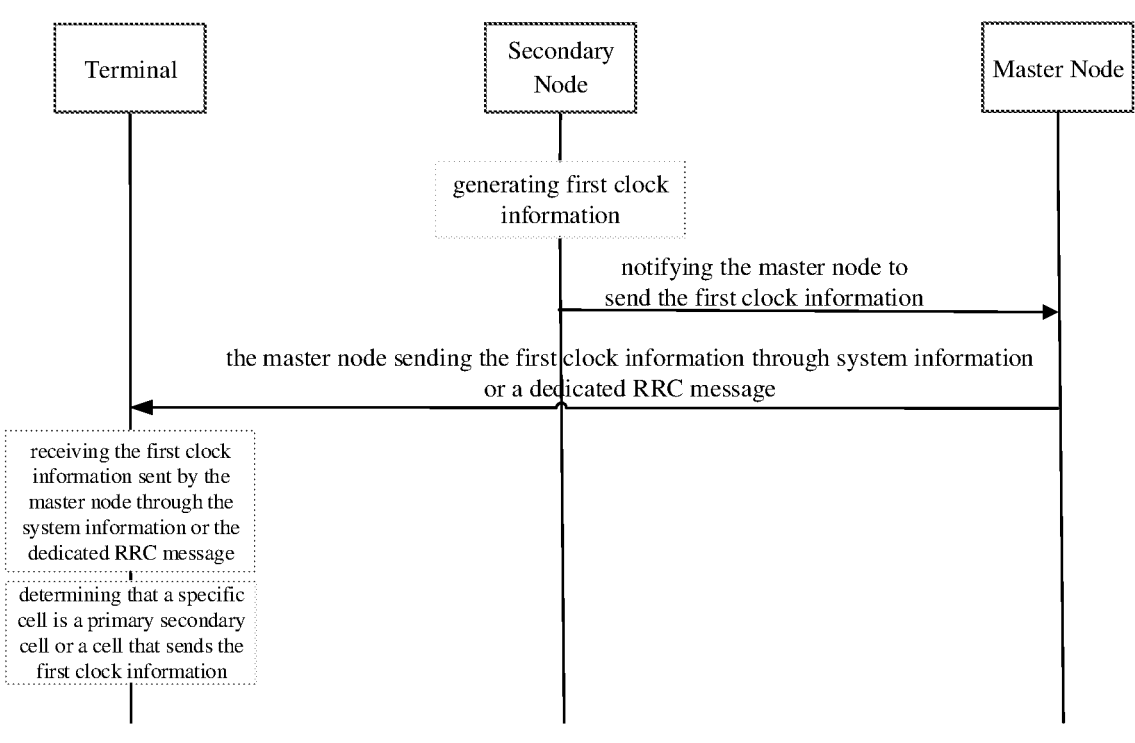
FIG. 2C is a schematic flowchart of determining a specific cell provided by an embodiment of the present disclosure.

In a specific implementation, if the first clock information is generated by the secondary node or corresponds to the secondary node, and the first node is the master node, the first clock information is sent to the terminal by the cell corresponding to the master node, and then the terminal can determine that the specific cell is the primary secondary cell or the cell that sends the first clock information. As an example shown in FIG. 2C, FIG. 2C is a schematic flowchart of determining a specific cell provided by an embodiment of the present disclosure. As shown in FIG. 2C, the network device corresponds to the first node, the first node is the master node, the secondary node generates the first clock information and notifies the master node to send the first clock information. The master node sends the first clock information to the terminal through the system information or the dedicated radio resource control (RRC) message. The terminal receives the first clock information sent by the master node through the system information or the dedicated radio resource control (RRC) message, and then the terminal can determine that the specific cell is the primary secondary cell or the cell that sends the first clock information.

In the embodiments, the secondary node first generates the first clock information, and notifies the primary cell corresponding to the master node to send the first clock information. Then, the primary cell corresponding to the master node sends the first clock information to the terminal; finally, the terminal receives the first clock information and can determine that the specific cell is the primary secondary cell, or the terminal can determine that the specific cell is the primary cell.

In the embodiments, the secondary node generates the first clock information, and the secondary node notifies the secondary cell corresponding to the master node to send the first clock information. The secondary cell corresponding to the master node sends the first clock information to the terminal, and the terminal receives the first clock information, and can determine that the specific cell is the primary secondary cell, or the terminal can determine that the specific cell is the secondary cell corresponding to the master node.

It can be seen that by setting that it is determined that the primary secondary cell or the cell that sends the first clock information is the specific cell in a case where it is determined that the first clock information is generated by the master node, the specific cell of the clock reference point determined by the terminal and the specific cell of the clock reference point determined by the network device can be consistent, thereby realizing the clock synchronization between the terminal and the network device.

In addition, in a case where it is determined that the first clock information is sent by the master node, it is determined that the primary secondary cell or the cell that sends the first clock information is the specific cell, so that the specific cell of the clock reference point determined by the terminal and the specific cell of the clock reference point determined by the network device can be consistent, thereby realizing the clock synchronization between the terminal and the network device, which will not be repeated here.

Optionally, in a case where the sending node and the generating node of the first clock information are inconsistent, the sending node may update or modify the first clock information generated by the generating node.

In some embodiments, the terminal may further receive first information, and the first information is used to indicate a position of the first clock information; and it is determined that the first clock information is generated by the master node or corresponds to the master node according to the first information, or it is determined that the first clock information is generated by the secondary node or corresponding to the secondary node according to the first information.

In a specific implementation, the terminal may receive the first information sent by the network device, and the first information may be sent by the cell of the master node, or the first information may be sent by the cell of the secondary node. Further, the terminal may determine that the first clock information is generated by the master node or corresponds to the master node according to the first information, or the terminal may determine that the first clock information is generated by the secondary node or corresponds to the secondary node according to the first information.

It can be seen that, through the first information sent by the network device, the terminal can determine whether the first clock information is generated by the master node or corresponds to the master node, or the first clock information is generated by the secondary node or corresponds to the secondary node, and then determine which cell to be used as the clock reference point.

In the embodiments, the determining that the first clock information is generated by the master node or the secondary node according to the first information, or determining that the first clock information corresponds to the master node or the secondary node according to the first information, includes:

if it is determined according to the first information that a position of the first clock information is within a container, determining that the first clock information is generated by the secondary node or corresponds to the secondary node;

otherwise, determining that the first clock information is generated by the master node or corresponds to the master node.

If the first clock information is within the container, it can be determined that the first clock information is generated by the secondary node or corresponds to the secondary node; and if the first clock information is outside the container, it can be determined that the first clock information is generated by the master node or corresponds to the master node.

In the embodiments, the determining that the first clock information is generated by the master node or the secondary node according to the first information, or determining that the first clock information corresponds to the master node or the secondary node according to the first information, includes that the first information is indicated to the UE by the network, and the first information is used to indicate node information corresponding to the first clock information/from the first clock information. The UE then determines the specific cell according to the first information.

In some embodiments, the determining, by the terminal, the specific cell according to the first clock information may include the following steps:

if the first clock information is generated by the secondary node or corresponds to the secondary node, determining, by the terminal, that the specific cell is the primary secondary cell.

The first clock information corresponding to the secondary node means that the service data packet corresponding to the first clock information is sent by the secondary node.

Figure 2D:
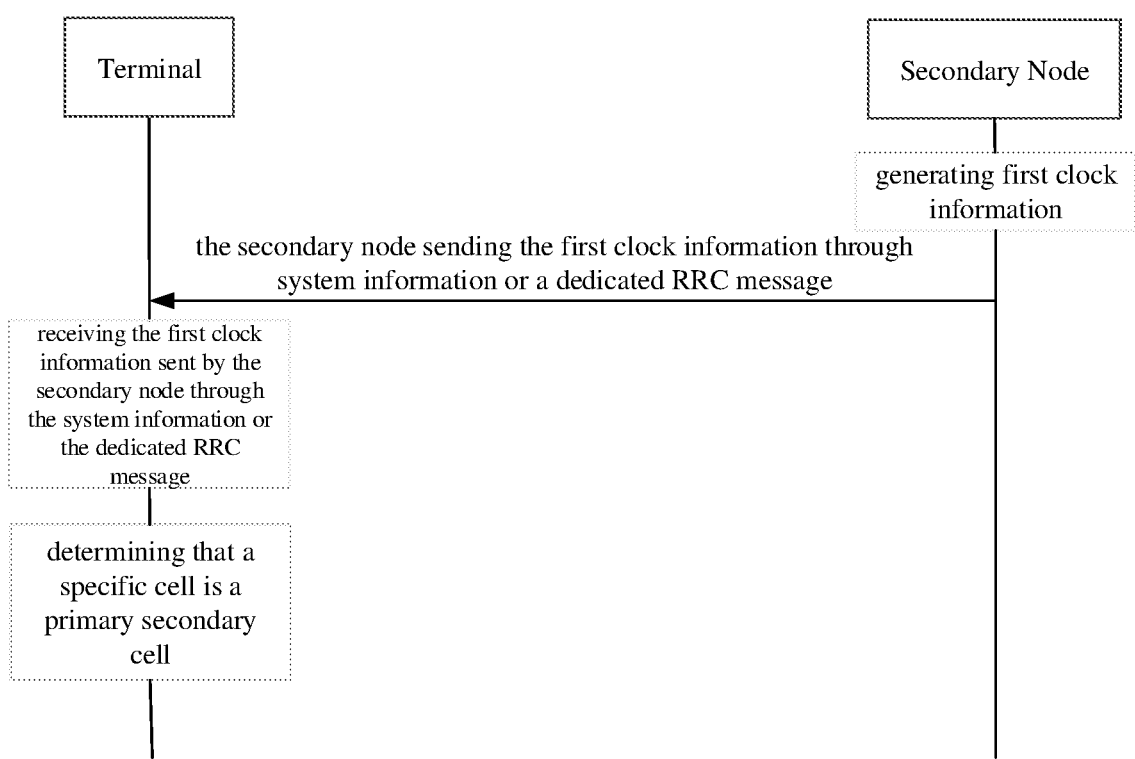
FIG. 2D is a schematic flowchart of determining a specific cell provided by an embodiment of the present disclosure.

In a specific implementation, if the first clock information is generated by the secondary node or corresponds to the secondary node, and the first node is the secondary node, the first clock information is sent to the terminal by the cell corresponding to the secondary node, and then the terminal can determine that the specific cell is the primary secondary cell. As an example shown in FIG. 2D, FIG. 2D is another schematic flowchart of determining a specific cell provided by an embodiment of the present disclosure. As shown in FIG. 2D, the network device corresponds to the first node, and the first node is the secondary node. The secondary node generates the first clock information, and sends the first clock information to the terminal through the system information or the dedicated radio resource control (RRC) message. The terminal receives the first clock information sent by secondary node through the system information or the dedicated radio resource control (RRC) message, and then the terminal can determine that the specific cell is the primary secondary cell.

In the embodiments, the secondary node generates the first clock information; the primary secondary cell corresponding to the secondary node send the first clock information to the terminal, and the terminal receives the first clock information and can determine that the specific cell is the primary secondary cell.

In the embodiments, the secondary node generates the first clock information; the secondary cell corresponding to the secondary node sends the first clock information to the terminal; the terminal receives the first clock information and can determine that the specific cell is the primary secondary cell.

Figures 2E, 2F:
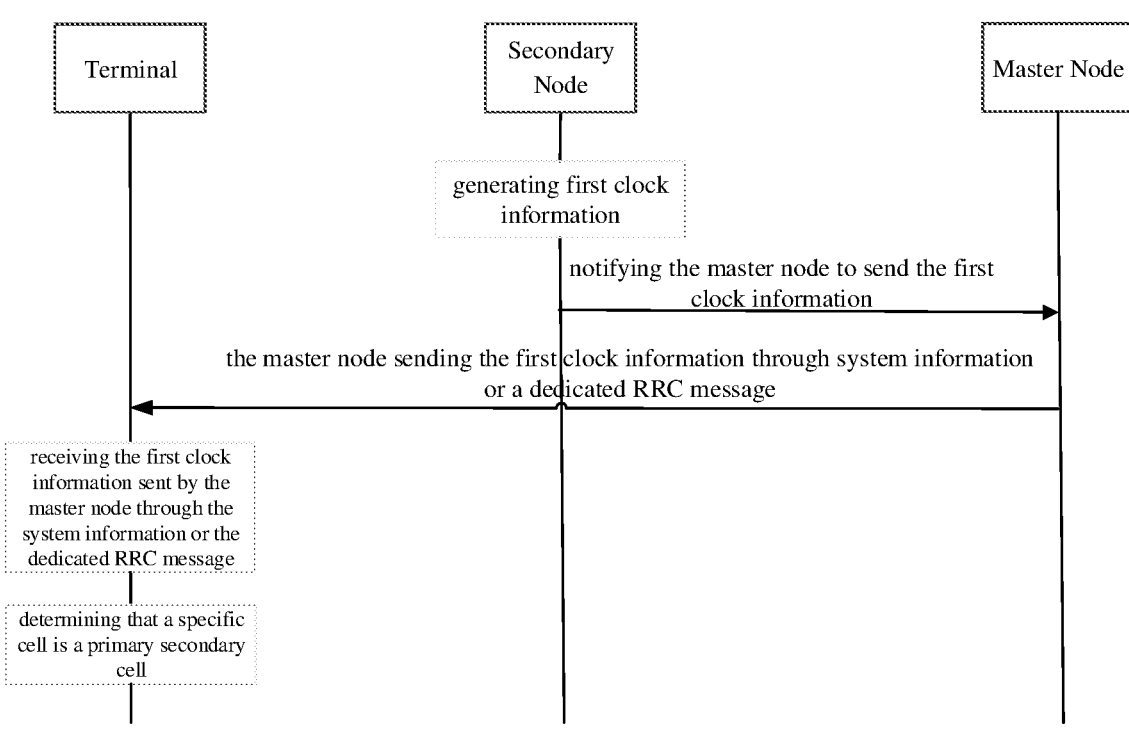
FIG. 2E is a schematic flow chart of determining a specific cell provided by an embodiment of the present disclosure.
FIG. 2F is a schematic flowchart of determining a specific cell provided by an embodiment of the present disclosure.

In a specific implementation, if the first clock information is generated by the secondary node or corresponds to the secondary node, and the first node is the master node, the first clock information is sent to the terminal by the cell corresponding to the master node, and then the terminal can determine that the specific cell is the primary secondary cell. As an example shown in FIG. 2E, FIG. 2E is a schematic flowchart of determining a specific cell provided by an embodiment of the present disclosure. As shown in FIG. 2E, the network device corresponds to the first node, and the first node is the master node. The secondary node generates the first clock information, and notifies the master node to send the first clock information. The master node sends the first clock information to the terminal through the system information or the dedicated radio resource control (RRC) message. The terminal receives the first clock information sent by master node through the system information or the dedicated radio resource control (RRC) message, and then the terminal can determine that the specific cell is the primary secondary cell.

In the embodiments, the secondary node first generates the first clock information and notifies the primary cell corresponding to the master node to send the first clock information. The primary cell corresponding to the master node then sends the first clock information to the terminal; and finally, the terminal receives the first clock information, and can determine that the specific cell is the primary secondary cell.

In the embodiments, the secondary node generates the first clock information, and notifies the secondary cell corresponding to the master node to send the first clock information. The secondary cell corresponding to the master node sends the first clock information to the terminal; and the terminal receives the first clock information, and can determine that the specific cell is the primary secondary cell.

It can be seen that by setting that it is determined that the primary secondary cell is the specific cell in a case where the first clock information is generated by the master node, the specific cell of the clock reference point determined by the terminal and the specific cell of the clock reference point determined by the network device can be consistent, thereby realizing the clock synchronization between the terminal and the network device.

In general, the first clock information corresponding to the secondary node or generated by the secondary node may be notified to the UE through the system information or the dedicated RRC message, or may be communicated to the master node and is notified to the UE by the master node. No matter which manner is used, the primary secondary cell can be used as the specific cell.

In addition, for the simplicity of implementation for UE, the base station may also process first reference clock information, so that it takes the clock of the primary cell as a reference, and correspondingly, the UE uses the primary cell as the specific cell.

In some embodiments, the determining, by the terminal, the specific cell according to the first clock information may include the following steps:

if the first clock information is generated by the secondary node or corresponds to the secondary node, determining, by the terminal, that the specific cell is the cell that sends the first clock information or the primary cell.

The first clock information corresponding to the secondary node means that the service data packet corresponding to the first clock information is sent by the secondary node.

In a specific implementation, if the first clock information is generated by the secondary node or corresponds to the secondary node, and the first node is the secondary node, the first clock information is sent to the terminal by the cell corresponding to the secondary node, and then the terminal can determine that the specific cell is the cell that sends the first clock information or the primary cell. As an example shown in FIG. 2F, FIG. 2F is another schematic flowchart of determining a specific cell provided by an embodiment of the present disclosure. As shown in FIG. 2F, the network device corresponds to the first node, and the first node is the secondary node. The secondary node generates the first clock information, and sends the first clock information to the terminal through the system information or the dedicated radio resource control (RRC) message. The terminal receives the first clock information sent by the secondary node through the system information or the dedicated radio resource control (RRC) message, and then the terminal can determine that the specific cell is the cell that sends the first clock information or the primary cell.

In the embodiments, the secondary node generates the first clock information; the primary secondary cell corresponding to the secondary node sends the first clock information to the terminal, and the terminal receives the first clock information, and can determine that the specific cell is the primary secondary cell, or can determine the specific cell is the primary cell.

In the embodiments, the secondary node generates the first clock information; the secondary cell corresponding to the secondary node sends the first clock information to the terminal; and the terminal receives the first clock information, and can determine that the specific cell is the secondary cell corresponding to the secondary node, or can determine that the specific cell is the primary cell.

In a specific implementation, if the first clock information is generated by the secondary node or corresponds to the secondary node, and the first node is the master node, the first clock information is sent to the terminal by the cell corresponding to the master node, and then the terminal can determine that the specific cell is the cell that sends the first clock information or the primary cell. As an example shown in FIG. 2G, FIG. 2G is a schematic flowchart of determining a specific cell provided by an embodiment of the present disclosure. As shown in FIG. 2G, the network device corresponds to the first node, and the first node is the master node. The secondary node generates the first clock information, and notifies the master node to send the first clock information. The master node sends the first clock information to the terminal through the system information or the dedicated radio resource control (RRC) message. The terminal receives the first clock information sent by the master node through the system information or the dedicated radio resource control (RRC) message, and then the terminal can determine that the specific cell is the cell that sends the first clock information or the primary cell.

In the embodiments, the secondary node first generates the first clock information, and notifies the primary cell corresponding to the master node to send the first clock information, and then the primary cell corresponding to the master node sends the first clock information to the terminal; and finally, the terminal receives the first clock information, and can determine that the specific cell is the primary cell.

In the embodiments, the secondary node generates the first clock information, and notifies the secondary cell corresponding to the master node to send the first clock information, and the secondary cell corresponding to the master node sends the first clock information to the terminal; the terminal receives the first clock information, and can determine that the specific cell is the secondary cell corresponding to the master node, or can determine that the specific cell is the primary cell.

It can be seen that by setting that it is determined that the primary secondary cell is the cell that sends the first clock information or the primary cell in a case where it is determined that the first clock information is generated by the master node, the specific cell of the clock reference point determined by the terminal and the specific cell of the clock reference point determined by the network device can be consistent, thereby realizing the clock synchronization between the terminal and the network device.

In some embodiments, the determining, by the terminal, the specific cell according to the first clock information may include the following steps:

if the first clock information is generated by the secondary node or corresponds to the secondary node, and is sent by the cell corresponding to the secondary node, determining that the specific cell is any one of the following: the primary secondary cell, any cell corresponding to the secondary node or the cell that sends the first clock information.

The first clock information corresponding to the secondary node means that the service data packet corresponding to the first clock information is sent by the secondary node.

In a specific implementation, the first clock information is generated by the secondary node or corresponds to the secondary node, the first node is the secondary node, and the first clock information is sent by the cell corresponding to the secondary node. Then the terminal can determine that the specific cell is the primary secondary cell, any cell corresponding to the secondary node, or the cell that sends the first clock information.

In the embodiments, the secondary node generates the first clock information; the primary secondary cell corresponding to the secondary node send the first clock information to the terminal, and the terminal receives the first clock information, and can determine that the specific cell is the primary secondary cell, or can determine that the specific cell is the secondary cell corresponding to the secondary node.

In the embodiments, the secondary node generates the first clock information; the secondary cell corresponding to the secondary node sends the first clock information to the terminal; the terminal receives the first clock information, and can determine that the specific cell is the secondary cell corresponding to the secondary node, or can determine that the specific cell is the primary secondary cell.

It can be seen that by setting that it is determined that the primary secondary cell is the cell that sends the first clock information or the primary cell in a case where it is determined that the first clock information is generated by the master node, the specific cell of the clock reference point determined by the terminal and the specific cell of the clock reference point determined by the network device can be consistent, thereby realizing the clock synchronization between the terminal and the network device.

In some embodiments, the determining, by the terminal, the specific cell according to the first clock information may include the following steps:

if the first clock information is generated by the secondary node or corresponds to the secondary node, and is sent by the cell corresponding to the master node, determining that the specific cell is the primary secondary cell or any cell corresponding to the secondary node.

The first clock information corresponding to the secondary node means that the service data packet corresponding to the first clock information is sent by the secondary node.

In a specific implementation, the first clock information is generated by the secondary node or corresponds to the secondary node, the first node is the master node, and the first clock information is sent by the cell corresponding to the master node. And then the terminal can determine that the specific cell is the primary secondary cell or any ell corresponding to the secondary node.

In the embodiments, the secondary node first generates the first clock information, and notifies the primary cell corresponding to the master node to send the first clock information. Then, the primary cell corresponding to the master node sends the first clock information to the terminal; and finally, the terminal receives the first clock information, and can determine that the specific cell is the primary secondary cell, or can determine that the specific cell is the secondary cell corresponding to the secondary node.

In the embodiments, the secondary node generates the first clock information, and notifies the secondary cell corresponding to the master node to send the first clock information. The secondary cell corresponding to the master node sends the first clock information to the terminal; the terminal receives the first clock information, and can determine that the specific cell is the primary secondary cell, or can determine that the specific cell is the secondary cell corresponding to the secondary node.

It can be seen that by setting that it is determined that the specific cell is the primary secondary cell or any cell corresponding to the secondary node in a case where it is determined that the first clock information is generated by the master node, the specific cell of the clock reference point determined by the terminal and the specific cell of the clock reference point determined by the network device can be consistent, thereby realizing the clock synchronization between the terminal and the network device.

In some embodiments, the determining, by the terminal, the specific cell according to the first clock information may include the following steps:

determining that the specific cell is the cell that sends the first clock information, or determining that the specific cell is a special cell corresponding to a node corresponding to the cell that sends the first clock information, when the first clock information satisfies at least one of the following conditions:

the first clock information is generated by the secondary node or corresponds to the secondary node, and is sent by a certain or any cell corresponding to the master node;

the first clock information is generated by the secondary node or corresponds to the secondary node, and is sent by a certain or any cell corresponding to the secondary node;

the first clock information is generated by the master node or corresponds to the master node, and is sent by a certain or any cell corresponding to the master node; and the first clock information is generated by the master node or corresponds to the master node, and is sent by a certain or any cell corresponding to the secondary node.

The first clock information corresponding to the secondary node means that the service data packet corresponding to the first clock information is sent by the secondary node.

In a specific implementation, if the first clock information is generated by the secondary node or corresponds to the secondary node, the first node is the master node, and the first clock information is sent to the terminal by a certain or any cell corresponding to the master node, the terminal can determine that the specific cell is the cell that sends the first clock information, or determine that the specific cell is the primary cell. As an example shown in FIG. 2H, FIG. 2H is a schematic flowchart of determining a specific cell provided by an embodiment of the present disclosure. As shown in FIG. 2H, the network device corresponds to the first node, and the first node is the master node. The secondary node generates the first clock information, and notifies the master node to send the first clock information. The first clock information can be included in the container, and the master node sends the first clock information to the terminal through the system information or the dedicated radio resource control (RRC) message. The terminal receives the first clock information sent by the master node through the system information or the dedicated radio resource control (RRC) message, and the terminal can determine that the first clock information corresponds to the secondary node according to the first clock information that can be included in the container, thereby determining that the specific cell is the cell that sends the first clock information, or that the specific cell is the primary cell.

In these embodiments, the secondary node first generates the first clock information, and notifies the primary cell corresponding to the master node to send the first clock information, and then the primary cell corresponding to the master node sends the first clock information to the terminal; and finally, the terminal receives the first clock information, and can determine that the specific cell is the primary cell.

In these embodiments, the secondary node generates the first clock information, and notifies the secondary cell corresponding to the master node to send the first clock information, and the secondary cell corresponding to the master node sends the first clock information to the terminal; the terminal receives the first clock information, and can determine that the specific cell is the secondary cell corresponding to the master node, or can determine that the specific cell is the primary cell.

Figure 2I:
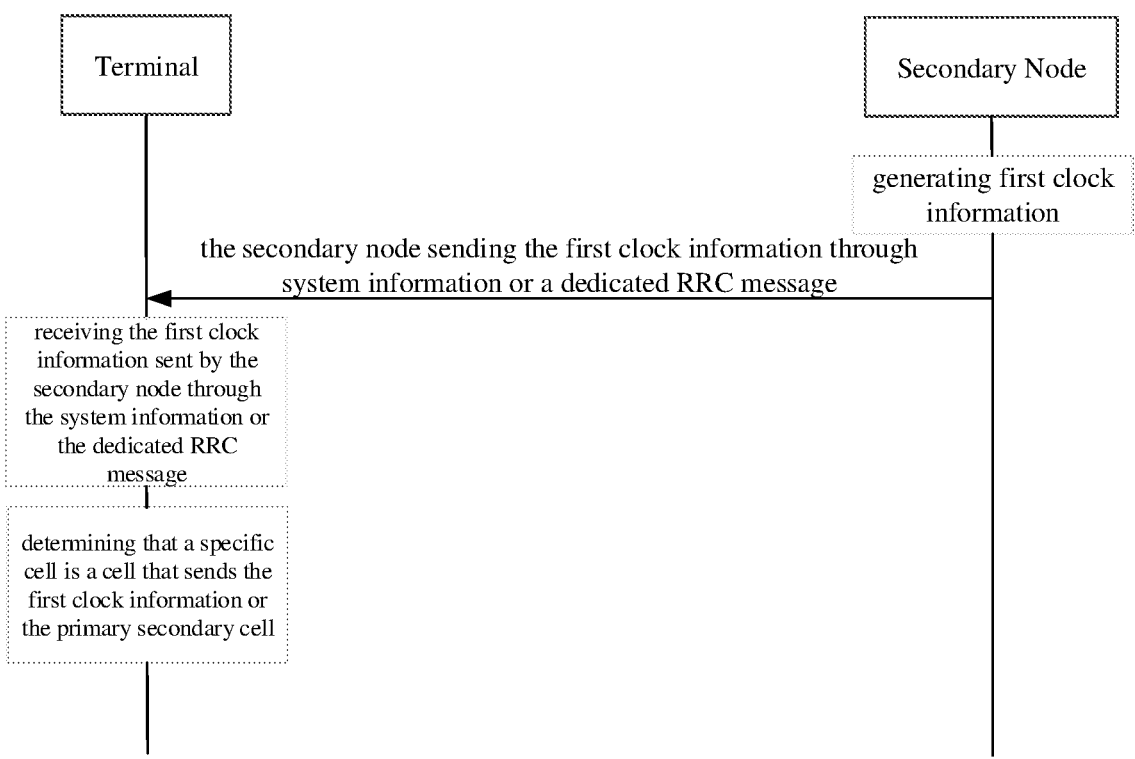
FIG. 2I is a schematic flowchart of determining a specific cell provided by an embodiment of the present disclosure.

In a specific implementation, if the first clock information is generated by the secondary node or corresponds to the secondary node, the first node is the secondary node, and the first clock information is sent to the terminal by the cell corresponding to the secondary node, the terminal can determine that the specific cell is the cell that sends the first clock information, or can determine that the specific cell is the primary secondary cell. As an example shown in FIG. 2I, FIG. 2I is another schematic flowchart of determining a specific cell provided by an embodiment of the present disclosure. As shown in FIG. 2I, the network device corresponds to the first node, and the first node is the secondary node. The secondary node generates the first clock information, and sends the first clock information to the terminal through the system information or the dedicated radio resource control (RRC) message. The terminal receives the first clock information sent by the secondary node through the system information or the dedicated radio resource control (RRC) message, and the terminal can determine that the specific cell is the cell that sends the first clock information or the primary secondary cell.

In the embodiments, the secondary node generates the first clock information; the primary secondary cell corresponding to the secondary node send the first clock information to the terminal, and the terminal receives the first clock information, and can determine that the specific cell is the primary secondary cell.

In the embodiments, the secondary node generates the first clock information; the secondary cell corresponding to the secondary node sends the first clock information to the terminal; the terminal receives the first clock information, and can determine that the specific cell is the secondary cell corresponding to the secondary node, or can determine that the specific cell is the primary secondary cell.

It can be seen that by setting that it is determined that the primary secondary cell is the cell that sends the first clock information or it is determined that the specific cell is a special cell corresponding to a node corresponding to the cell that sends the first clock information in a case where it is determined that the first clock information is generated by the master node, the specific cell of the clock reference point determined by the terminal and the specific cell of the clock reference point determined by the network device can be consistent, thereby realizing the clock synchronization between the terminal and the network device.

In some embodiments, the determining, by the terminal, the specific cell according to the first clock information may include the following steps:

determining that the specific cell is the primary cell when the first clock information satisfies at least one of the following conditions:

the first clock information is generated by the secondary node or corresponds to the secondary node, and is sent by a certain or any cell corresponding to the master node;

the first clock information is generated by the secondary node or corresponds to the secondary node, and is sent by a certain or any cell corresponding to the secondary node;

the first clock information is generated by the master node or corresponds to the master node, and is sent by a certain or any cell corresponding to the master node; and the first clock information is generated by the master node or corresponds to the master node, and is sent by a certain or any cell corresponding to the secondary node.

The first clock information corresponding to the secondary node means that the service data packet corresponding to the first clock information is sent by the secondary node.

Figure 2J:
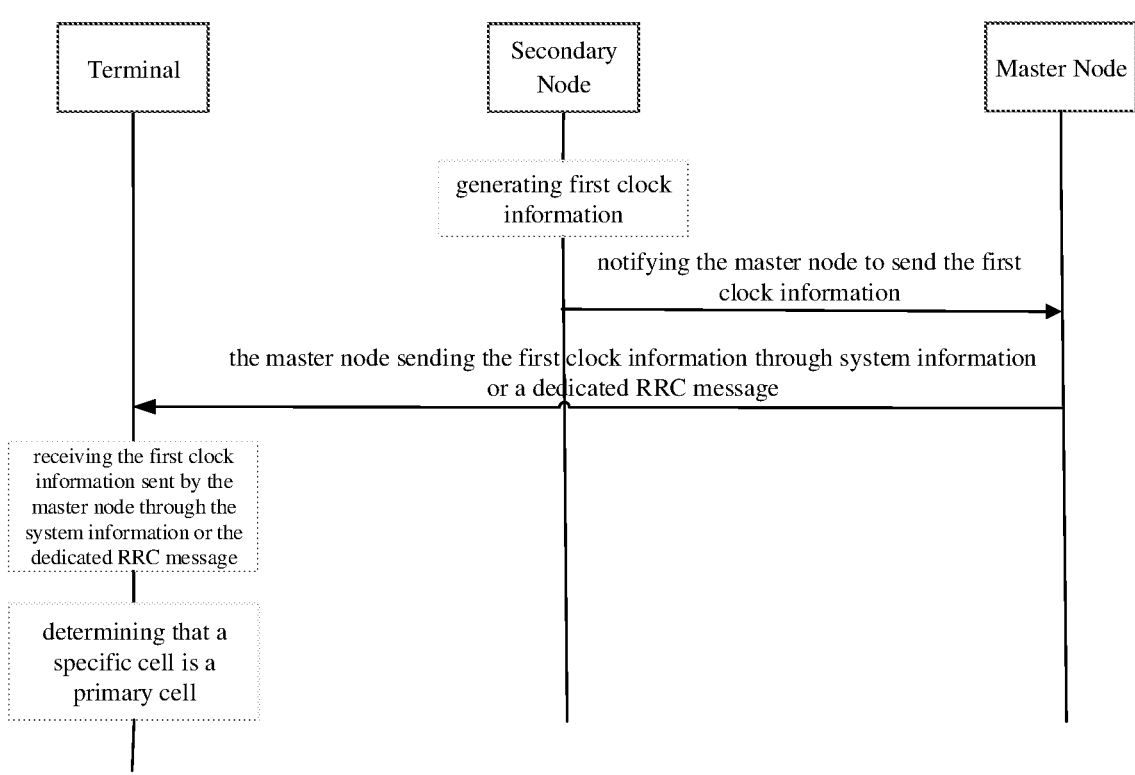
FIG. 2J is a schematic flowchart of determining a specific cell provided by an embodiment of the present disclosure.

In a specific implementation, if the first clock information is generated by the secondary node or corresponds to the secondary node, the first node is the master node, and the first clock information is sent to the terminal by any cell corresponding to the master node, the terminal can determine that the specific cell is the primary cell. As an example shown in FIG. 2J, FIG. 2J is a schematic flowchart of determining a specific cell provided by an embodiment of the present disclosure. As shown in FIG. 2J, the network device corresponds to the first node, and the first node is the master node. The secondary node generates the first clock information, and notifies the master node to send the first clock information. The first clock information can be included in the container, and the master node sends the first clock information to the terminal through the system information or the dedicated radio resource control (RRC) message. The terminal receives the first clock information sent by the master node through the system information or the dedicated radio resource control (RRC) message, and the terminal can determine that the specific cell is the primary cell.

In the embodiments, the secondary node first generates the first clock information, and notifies the primary cell corresponding to the master node to send the first clock information, and then the primary cell corresponding to the master node sends the first clock information to the terminal; and finally, the terminal receives the first clock information, and can determine that the specific cell is the primary cell.

In the embodiments, the secondary node generates the first clock information, and notifies the secondary cell corresponding to the master node to send the first clock information. The secondary cell corresponding to the master node sends the first clock information to the terminal; and the terminal receives the first clock information, and can determine that the specific cell is the primary cell.

Figure 2K:
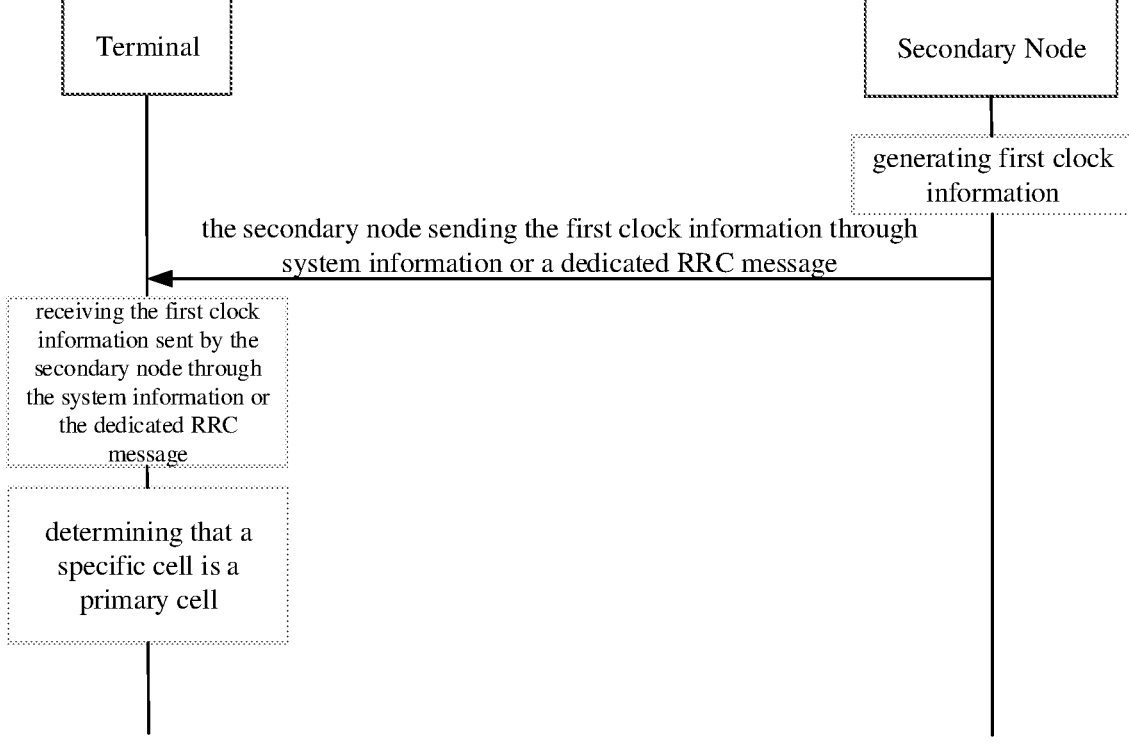
FIG. 2K is a schematic flowchart of determining a specific cell provided by an embodiment of the present disclosure.

In a specific implementation, if the first clock information is generated by the secondary node or corresponds to the secondary node, the first node is the secondary node, and the first clock information is sent to the terminal by the cell corresponding to the secondary node, the terminal can determine that the specific cell is the primary cell. As an example shown in FIG. 2K, FIG. 2K is another schematic flowchart of determining a specific cell provided by an embodiment of the present disclosure. As shown in FIG. 2K, the network device corresponds to the first node, and the first node is the secondary node. The secondary node generates the first clock information, and sends the first clock information to the terminal through the system information or the dedicated radio resource control (RRC) message. The terminal receives the first clock information sent by the secondary node through the system information or the dedicated radio resource control (RRC) message, and the terminal can determine that the specific cell is the primary cell.

In the embodiments, the secondary node generates the first clock information; the primary secondary cell corresponding to the secondary node sends the first clock information to the terminal, and the terminal receives the first clock information and can determine that the specific cell is the primary cell.

In the embodiments, the secondary node generates the first clock information; the secondary cell corresponding to the secondary node sends the first clock information to the terminal; and the terminal receives the first clock information and can determine that the specific cell is the primary cell.

In general, no matter which node generates the first clock information or which node the first clock information corresponds to, and/or, no matter which cell sends the first clock information to the UE, the UE considers the primary cell as the specific cell.

It can be seen that by setting that it is determined that the primary secondary cell is the primary cell in a case where it is determined that the first clock information is generated by the master node, the specific cell of the clock reference point determined by the terminal and the specific cell of the clock reference point determined by the network device can be consistent, thereby realizing the clock synchronization between the terminal and the network device.

In some embodiments, the determining, by the terminal, the specific cell according to the first clock information may include the following steps:

receiving network-indicated reference cell information, the network-indicated reference cell information being used to indicate a cell corresponding to the first clock information; and determining the specific cell according to the cell corresponding to the first clock information.

The network-indicated reference cell information may indicate a cell identifier corresponding to the reference system frame number, and then the specific cell can be determined according to a cell corresponding to the cell identifier.

When the network device indicates the first clock information through the system information or the dedicated radio resource control (RRC) message, it also indicates the cell corresponding to the first clock information. Specifically, the network-indicated reference cell information may include the reference system frame number, and then the cell identifier corresponding to the reference system frame number can be determined. The first node corresponding to the network device may be the master node or the secondary node.

In a specific implementation, the terminal may receive the system information or the dedicated radio resource control (RRC) message from the network device to obtain the first clock information. Specifically, the terminal determines the corresponding cell when the first clock information is generated or sent, according to the cell identifier indicated by the network device, and can determine that this cell is a cell corresponding to the reference system frame number and/or time. Then, the terminal can determine time information corresponding to the indicated reference system frame number according to the frame boundary of the cell and the system frame number information, and then complete the clock synchronization with the network device.

Figure 2L:
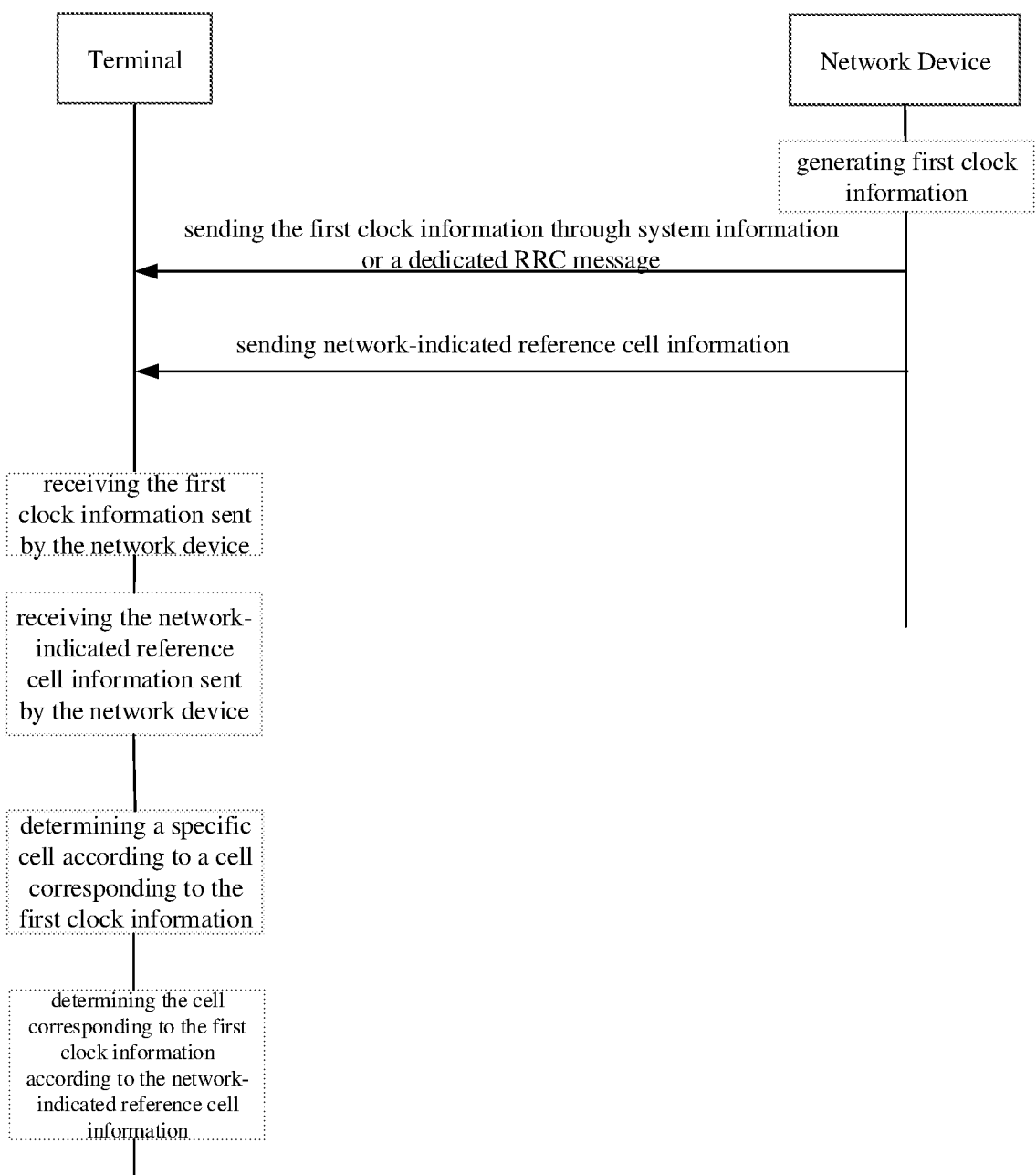
FIG. 2L is a schematic flowchart of determining a specific cell provided by an embodiment of the present disclosure.

Reference is made to FIG. 2L, which is another schematic flowchart of determining a specific cell provided by an embodiment of the present disclosure. As shown in FIG. 2L, the first node corresponding to the network device that sends the first clock information is the master node or the secondary node, and the network device sends the first clock information to the terminal through the system information or the dedicated radio resource control (RRC) message, and sends the network-indicated reference cell information to the terminal. The terminal can receive the first clock information sent by the network device; and receive the network-indicated reference cell information sent by the network device, and then determine the cell corresponding to the first clock information according to the network-indicated reference cell information; and then determines the specific cell according to the cell corresponding to the first clock information.

In the embodiments, if it is determined according to the network-indicated reference cell information that the cell corresponding to the first clock information is the primary cell, the terminal can determine that the specific cell is the primary cell. If it is determined according to the network-indicated reference cell information that the cell corresponding to the first clock information is the secondary cell corresponding to the master node, the terminal can determine that the specific cell is the secondary cell corresponding to the master node. If it is determined according to the network-indicated reference cell information that the cell corresponding to the first clock information is the primary secondary cell, the terminal can determine that the specific cell is the primary secondary cell. If it is determined according to the network-indicated reference cell information that the cell corresponding to the first clock information is the secondary cell corresponding to the secondary node, the terminal can determine that the specific cell is the secondary cell corresponding to the secondary node.

In some embodiments, the determining the specific cell according to the first clock information and the second clock information may include the following steps:

determining a first reference range of the specific cell according to the first clock information; and determining a second reference range of the specific cell according to the second clock information; and determining a same cell in the first reference range and the first reference range as the specific cell.

In a specific implementation, the first reference range of the specific cell may be determined according to the first clock information.

For example, the terminal determines, according to the received first clock information, the first reference range of the specific cell as: the primary cell, the secondary cell of the master node, or the primary secondary cell. The terminal further determines the second reference range of the specific cell according to the second clock information, for example, the second reference range is: the primary cell, and the primary secondary cell. Then, it can be determined that the same cell in the first reference range and the first reference range is the primary cell, and thus it can be determined that the specific cell is the primary cell, and the primary cell can be used as the clock reference point.

In some embodiments, the network device corresponding to the first node may also receive third clock information from the second node, modify or update the third clock information, and send the modified or updated third clock information to the terminal. The third clock information is used by the terminal to determine the specific cell and/or to perform the clock synchronization.

Figure 2M:
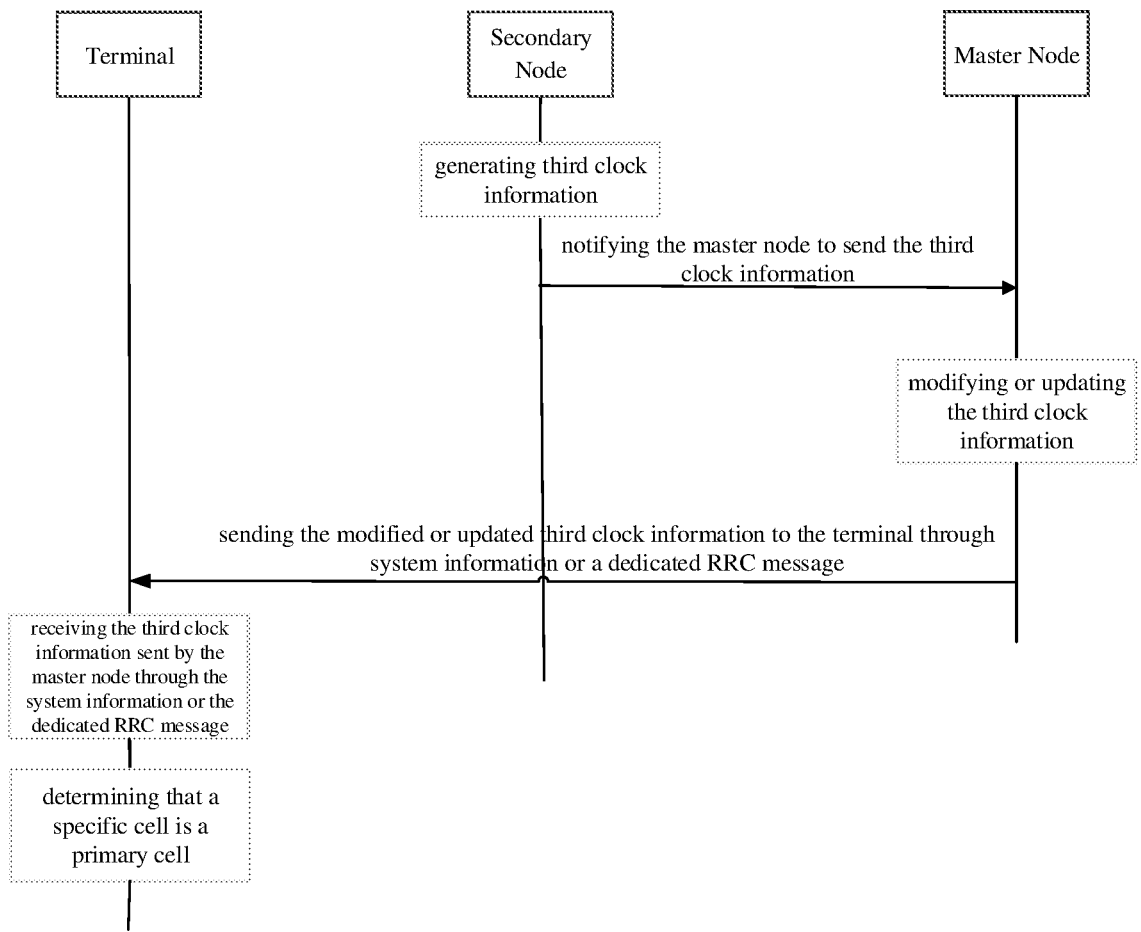
FIG. 2M is a schematic flowchart of determining a specific cell provided by an embodiment of the present disclosure.

Reference is made to FIG. 2M, which is another schematic flowchart of determining a specific cell provided by an embodiment of the present disclosure. As shown in FIG. 2M, the network device corresponds to the first node, the first node is the master node, and the second node is the secondary node. The secondary node generates the third clock information and sends the third clock information to the master node, the master node modifies or updates the third clock information and sends the modified or updated third clock information to the terminal through the system information or the dedicated radio resource control (RRC) message. The terminal receives the third clock information sent by the master node through the system information or the dedicated radio resource control (RRC) message, and can determine that the specific cell is the primary cell.

Figure 2N:
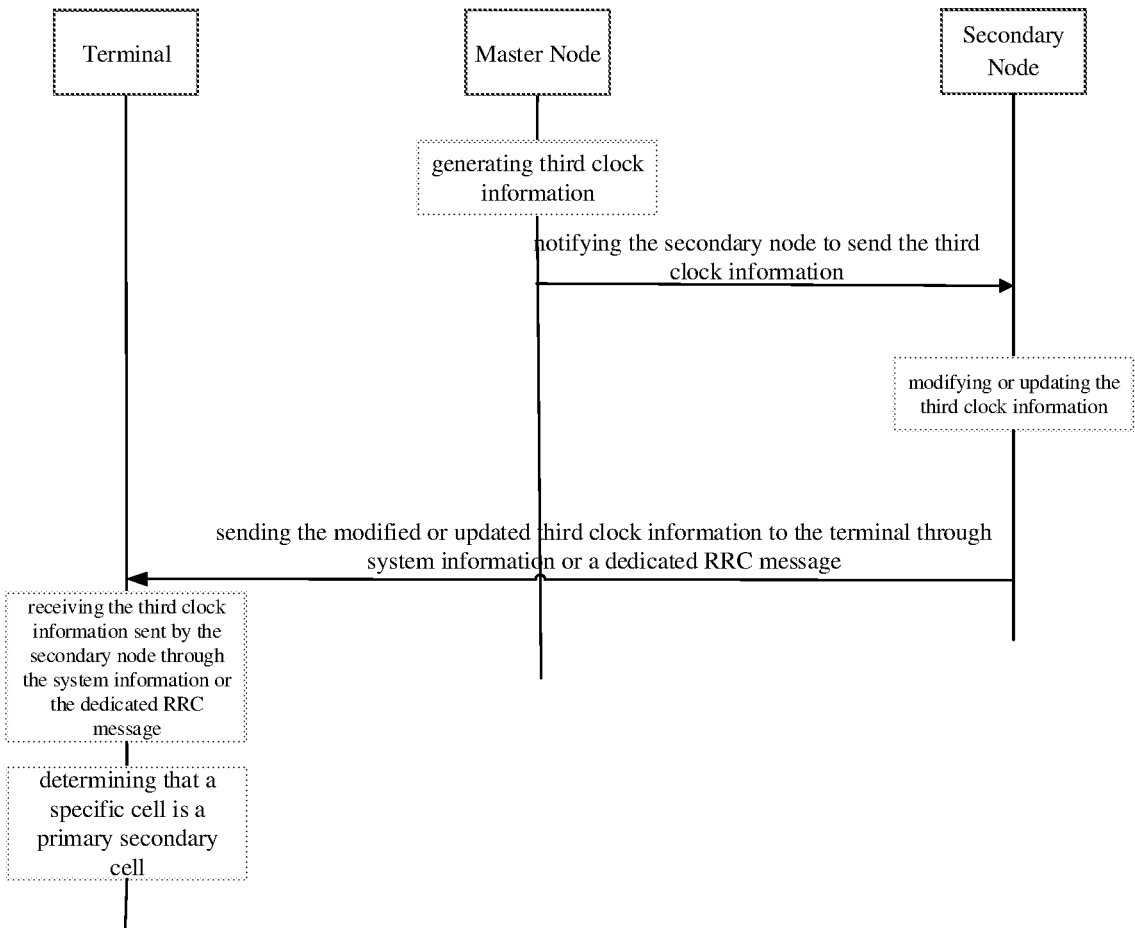
FIG. 2N is a schematic flowchart of determining a specific cell provided by an embodiment of the present disclosure.

Reference is made to FIG. 2N, which is another schematic flowchart of determining a specific cell provided by an embodiment of the present disclosure. As shown in FIG. 2N, the network device corresponds to the first node, the first node is the secondary node, and the second node is the master node. The master node generates the third clock information and sends the third clock information to the secondary node, the secondary node modifies or updates the third clock information and sends the modified or updated third clock information to the terminal through the system information or the dedicated radio resource control (RRC) message. The terminal receives the first clock information sent by the secondary node through the system information or the dedicated radio resource control (RRC) message, and can determine that the specific cell is the primary secondary cell.

Further, in order to reduce the complexity of the UE, it is also possible to define that the first clock information is sent only through the primary cell, or only through the primary secondary cell, or through both the primary cell and the primary secondary cell.

In some embodiments, if the terminal receives the first clock information and the second clock information, the terminal determines one cell as the specific cell, or determines two cells as the specific cells.

In a specific implementation, if the terminal receives the first clock information and the second clock information within a preset time period, the terminal may determine one cell as the specific cell, or determine two cells as the specific cells.

Figure 2O:
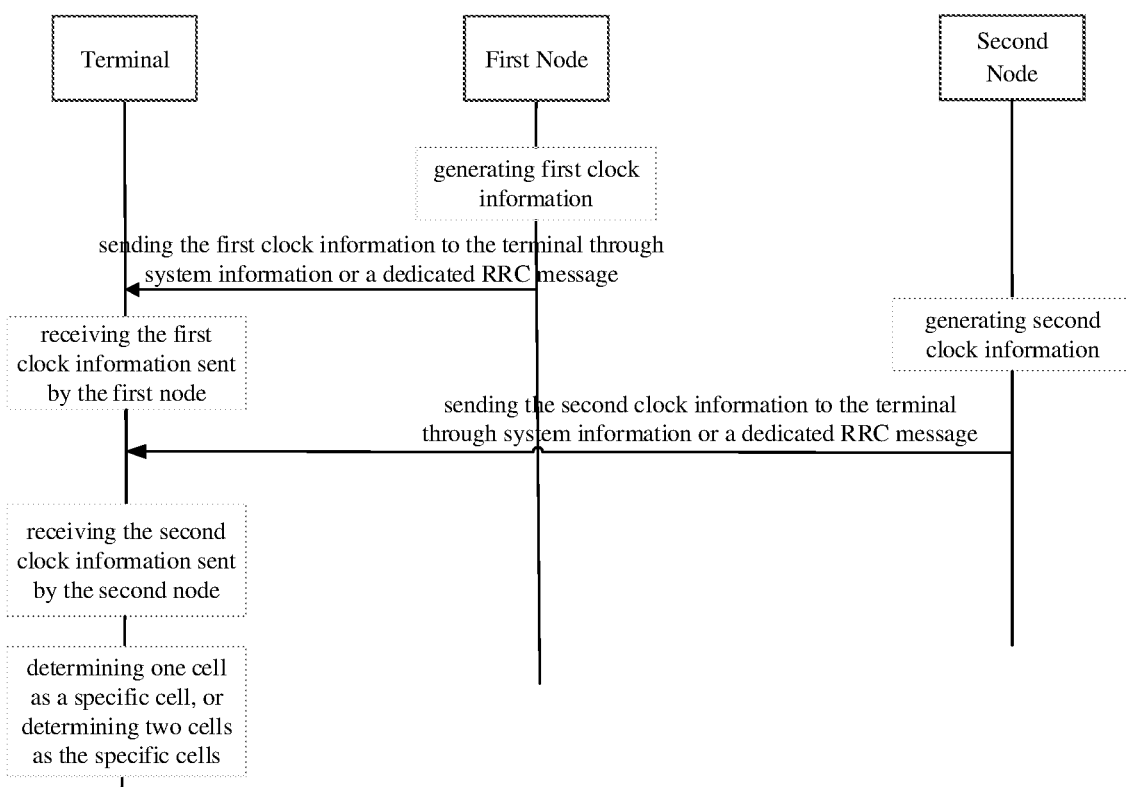
FIG. 2O is a schematic flowchart of determining a specific cell provided by an embodiment of the present disclosure.

Reference is made to FIG. 2O, which is another schematic flowchart of determining a specific cell provided by an embodiment of the present disclosure. As shown in FIG. 2O, assuming that the first node sends the first clock information to the terminal through the system information or the dedicated radio resource control (RRC) message, and the second node sends the second clock information to the terminal through the system information or the dedicated radio resource control (RRC) message. The terminal receives the first clock information sent by the first node and the second clock information sent by the second node, and then the terminal may determine one cell as the specific cell, for example, the terminal may determine that the primary cell is the specific cell. Alternatively, the terminal may also determine two cells as the specific cells, for example, the terminal may determine that the primary cell and the primary secondary cell are the specific cells.

In the embodiments, the terminal receives the first clock information and the second clock information at a first time, and the terminal may determine one cell as the specific cell (for example, determining that the primary cell is the specific cell).

In the embodiments, the terminal receives the second clock information after a preset second time after receiving the first clock information, and the terminal may determine two cells as the specific cells (for example, determining that the primary cell and the primary secondary cell are the specific cells).

Figure 3:
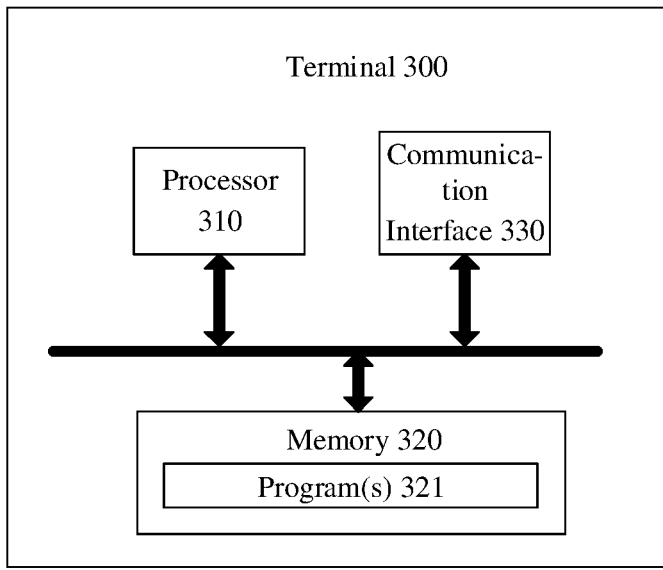
FIG. 3 is a schematic structural diagram of a terminal provided by an embodiment of the present disclosure.

Consistent with the above embodiments shown in FIG. 2A, reference is made to FIG. 3 which is a schematic structural diagram of a terminal 300 provided by an embodiment of the present disclosure. As shown, the terminal 300 includes a processor 310, a memory 320, a communication interface 330 and one or more programs 321, and the one or more programs 321 are stored in the memory 320 and are configured to be executed by the processor 310. The one or more programs 321 include instructions for executing the following operations:

receiving at least one piece of clock information;

determining a specific cell according to the at least one piece of clock information; and using the specific cell as a clock reference point and performing clock synchronization according to the at least one piece of clock information.

As can be seen, in the embodiments of the present disclosure, the terminal receives the at least one piece of clock information from the network device, determines the specific cell according to the at least one piece of clock information, and uses the specific cell as the clock reference point and performs the clock synchronization according to the at least one piece of clock information, so that a clock synchronization error caused by inconsistent understandings by the terminal and the network device with regard to the specific cell that serves as the clock reference point can be avoided, and the clock synchronization between the terminal and the network device is ensured.

In some embodiments, the specific cell is any one of the following: a primary cell, a primary secondary cell, any cell of a master node, any cell of a secondary node, or a cell that sends the clock information.

In some embodiments, the at least one piece of clock information is generated by the master node and/or the secondary node.

In some embodiments, the at least one piece of clock information is sent by the primary cell and/or the primary secondary cell.

In some embodiments, with respect to determining the specific cell according to the at least one piece of clock information, the one or more programs 321 include instructions for executing the following operations:

if first clock information sent by a first node is received, determining the specific cell according to the first clock information;

if the first clock information sent by the first node and second clock information sent by a second node are received, determining the specific cell according to the first clock information and the second clock information; and if the first node is the master node, the second node is the secondary node; and if the first node is the secondary node, the second node is the master node.

In some embodiments, with respect to determining the specific cell according to the first clock information, the one or more programs 321 include instructions for executing the following operations:

if the first clock information is generated by the master node, determining that the specific cell is any one of the following: the primary cell, any cell of the master node, or a cell that sends the first clock information.

In some embodiments, with respect to determining the specific cell according to the first clock information, the one or more programs 321 include instructions for executing the following operations:

if the first clock information is generated by the secondary node or corresponds to the secondary node, determining that the specific cell is the primary secondary cell or the cell that sends the first clock information.

In some embodiments, with respect to determining the specific cell according to the first clock information, the one or more programs 321 include instructions for executing the following operations:

if the first clock information is generated by the secondary node or corresponds to the secondary node, determining that the specific cell is the primary secondary cell.

In some embodiments, with respect to determining the specific cell according to the first clock information, the one or more programs 321 include instructions for executing the following operations:

if the first clock information is generated by the secondary node or corresponds to the secondary node, determining that the specific cell is the cell that sends the first clock information or the primary cell.

In some embodiments, with respect to determining the specific cell according to the first clock information, the one or more programs 321 include instructions for executing the following operations:

if the first clock information is generated by the secondary node or corresponds to the secondary node, and is sent by a cell corresponding to the secondary node, determining that the specific cell is any one of the following: the primary secondary cell, any cell corresponding to the secondary node, or the cell that sends the first clock information.

In some embodiments, with respect to determining the specific cell according to the first clock information, the one or more programs 321 include instructions for executing the following operations:

if the first clock information is generated by the secondary node or corresponds to the secondary node, and is sent by a cell corresponding to the master node, determining that the specific cell is the primary secondary cell or any cell corresponding to the secondary node.

In some embodiments, with respect to determining the specific cell according to the first clock information, the one or more programs 321 include instructions for executing the following operations:

determining that the specific cell is the cell that sends the first clock information, or determining that the specific cell is a special cell corresponding to a node corresponding to the cell that sends the first clock information, when the first clock information satisfies at least one of the following conditions:

the first clock information is generated by the secondary node or corresponds to the secondary node, and is sent by any cell corresponding to the master node;

the first clock information is generated by the secondary node or corresponds to the secondary node, and is sent by any cell corresponding to the secondary node;

the first clock information is generated by the master node or corresponds to the master node, and is sent by any cell corresponding to the master node; and the first clock information is generated by the master node or corresponds to the master node, and is sent by any cell corresponding to the secondary node.

In some embodiments, with respect to determining the specific cell according to the first clock information, the one or more programs 321 include instructions for executing the following operations:

determining that the specific cell is the primary cell when the first clock information satisfies at least one of the following conditions:

the first clock information is generated by the secondary node or corresponds to the secondary node, and is sent by any cell corresponding to the master node;

the first clock information is generated by the secondary node or corresponds to the secondary node, and is sent by any cell corresponding to the secondary node;

the first clock information is generated by the master node or corresponds to the master node, and is sent by any cell corresponding to the master node; and the first clock information is generated by the master node or corresponds to the master node, and is sent by any cell corresponding to the secondary node.

In some embodiments, the one or more programs 321 further include instructions for executing the following operations:

receiving first information, where the first information is used to indicate a position of the first clock information; and determining that the first clock information is generated by the master node or corresponds to the master node according to the first information, or determining that the first clock information is generated by the secondary node or corresponds to the secondary node according to the first information.

In some embodiments, with respect to determining that the first clock information is generated by the master node or corresponds to the master node according to the first information, or determining that the first clock information is generated by the secondary node or corresponds to the secondary node according to the first information, the one or more programs 321 include instructions for executing the following operations:

if it is determined according to the first information that a position of the first clock information is within a container, determining that the first clock information is generated by the secondary node or corresponds to the secondary node;

otherwise, determining that the first clock information is generated by the master node or corresponds to the master node.

In some embodiments, with respect to determining the specific cell according to the first clock information, the one or more programs 321 include instructions for executing the following operations:

receiving network-indicated reference cell information, where the network-indicated reference cell information is used to indicate a cell corresponding to the first clock information; and determining the specific cell according to the cell corresponding to the first clock information.

In some embodiments, with respect to determining the specific cell according to the first clock information and the second clock information, the one or more programs 321 include instructions for executing the following operations:

determining a first reference range of the specific cell according to the first clock information; and determining a second reference range of the specific cell according to the second clock information; and determining that the same cell in the first reference range and the second reference range is the specific cell.

In some embodiments, with respect to receiving the at least one piece of clock information, the one or more programs 321 include instructions for executing the following operations:

receiving a system message or a dedicated radio resource control (RRC) message sent by a cell corresponding to the first node; and/or receiving a system message or a dedicated radio resource control (RRC) message sent by a cell corresponding to the second node; where the system information includes the clock information, and the dedicated radio resource control (RRC) message includes the clock information.

In some embodiments, a type of the system information is any one of the following: a system information block (SIB) 1 or a system information block (SIB) 9.

In some embodiments, a type of the dedicated radio resource control (RRC) message is any one of the following: a signaling radio bear (SRB) 1 message, a signaling radio bear (SRB) 2 message, a signaling radio bear (SRB) 3 message or a downlink information transmission message.

In some embodiments, the first clock information includes at least one of the following information: reference clock information, a time, an uncertainty index, a time information type, and a reference system frame number.

Figure 4:
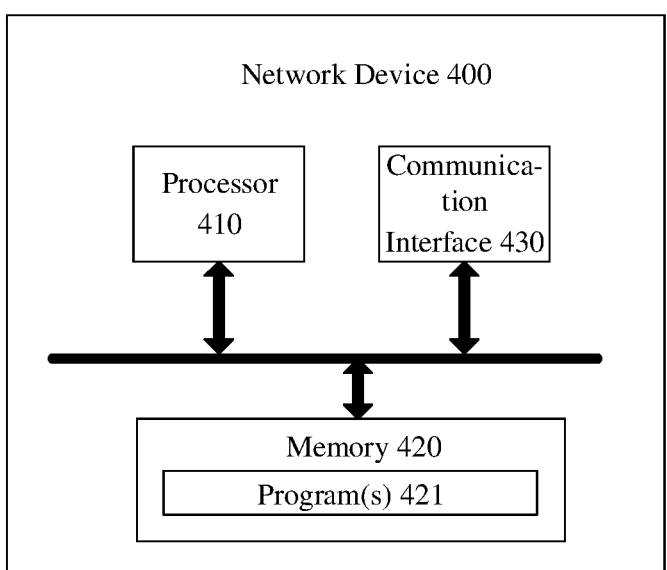
FIG. 4 is a schematic structural diagram of a network device provided by an embodiment of the present disclosure.

Reference is made to FIG. 4 which is a schematic structural diagram of a network device 400 provided by an embodiment of the present disclosure. As shown, the network device 400 includes a processor 410, a memory 420, a communication interface 430, and one or more programs 421, and the one or more programs 421 are stored in the memory 420 and are configured to be executed by the processor 410, the one or more programs 421 including instructions for executing the following operations:

sending first clock information to a terminal, where the first clock information is used by the terminal to perform the following operations: determining a specific cell according to the first clock information; and using the specific cell as a clock reference point and performing clock synchronization according to the first clock information.

As can be seen, in the embodiments of the present disclosure, the terminal is communicatively connected to the network device, and the network device sends the first clock information to the terminal. The terminal determines the specific cell according to the first clock information, uses the specific cell as the clock reference point, and performs the clock synchronization according to the first clock information. Therefore, by determining by the terminal the specific cell serving as the clock reference point, using the specific cell as the clock reference point, and performing the clock synchronization according to the first clock information related to the specific cell, a clock synchronization error caused by inconsistent understandings with regard to the specific cell that serves as the clock reference point by the terminal and the network device can be avoided, and the clock synchronization between the terminal and the network device is ensured.

In some embodiments, the network device is a first node in a Dual Connectivity (DC) network architecture, and the DC network architecture further includes a second node, and if the first node is a master node, the second node is a secondary node; and if the first node is the secondary node, the second node is the master node. The first clock information is further used by the terminal to perform the following operations: determining the specific cell according to the first clock information, and second clock information sent by the second node to the terminal; and using the specific cell as the clock reference point, and performing the clock synchronization according to the first clock information and the second clock information.

In some embodiments, the first clock information is generated by the master node or the secondary node.

In some embodiments, the first clock information is sent by a primary cell or a primary secondary cell.

In some embodiments, with respect to sending the first clock information to the terminal, the one or more programs 421 include instructions for executing the following operations:

sending a system message to the terminal through a cell corresponding to the first node, the system information including the first clock information; or sending a dedicated radio resource control (RRC) message to the terminal through the cell corresponding to the first node, the dedicated radio resource control (RRC) message including the first clock information.

In some embodiments, a type of the system information is any one of the following: a system information block (SIB) 1 or a system information block (SIB) 9.

In some embodiments, a type of the dedicated radio resource control (RRC) message is any one of the following: a signaling radio bear (SRB) 1 message, a signaling radio bear (SRB) 2 message, a signaling radio bear (SRB) 3 message or a downlink information transmission message.

In some embodiments, the one or more programs 421 further include instructions for executing the following operations:

sending first information to the terminal, where the first information is used to indicate a position of the clock information; the first information is used by the terminal to perform the following operations: determining that the first clock information is generated by the master node or corresponds to the master node according to the first information, or determining that the clock information is generated by the secondary node or corresponds to the secondary node according to the first information.

In some embodiments, the one or more programs 421 further include instructions for executing the following operations:

sending network-indicated reference cell information to the terminal, where the network-indicated reference cell information is used to indicate a cell corresponding to the first clock information, and to indicate the terminal to perform the following operations: determining the specific cell according to the cell corresponding to the first clock information.

In some embodiments, the first clock information includes at least one of the following information: reference clock information, a time, an uncertainty index, a time information type, and a reference system frame number.

In some embodiments, the one or more programs 421 further include instructions for executing the following operations:

receiving third clock information from the second node, modifying or updating the third clock information, and sending the modified or updated third clock information to the terminal, where the third clock information is used by the terminal to determine the specific cell and/or to perform the clock synchronization.

Technical solutions of the embodiments in the present disclosure are described above from an aspect of interaction between the network elements. It can be understood that in order to implement the above functions, the terminal may include corresponding hardware structures and/or software modules for performing the functions. Those skilled in the art should easily understand that the present disclosure can be implemented in the form of hardware or combination of hardware and computer software in conjunction with the units and algorithm steps in the examples described in the embodiments of the present disclosure. Whether a function is performed in the form of hardware or computer softwaredriven hardware depends on a specific application and a design constraint of the technical solution. Those skilled in the art can implement the described functions in different ways for each particular application, and such implementation should not be considered beyond the scope of the present disclosure.

In the embodiments of the present disclosure, functional units of the terminal can be divided based on the above method examples.

For example, each functional unit may be divided corresponding to each function, and two or more functions may be integrated into one processing unit. The integrated unit may be implemented in the form of hardware or software program module. It should be noted that the division of units in the embodiments of the present disclosure is schematic and is only a logical function division, and there may be other division manners in actual implementations.

Figure 5:
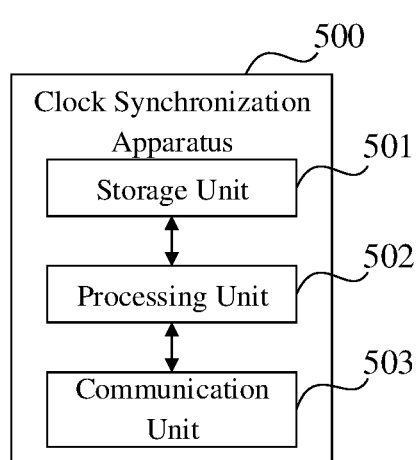
FIG. 5 is a block diagram of functional units of a clock synchronization apparatus provided by an embodiment of the present disclosure.

In a case where an integrated unit is adopted, FIG. 5 shows a possible block diagram of functional units of a clock synchronization apparatus involved in the above embodiments. The clock synchronization apparatus 500 is applied to a terminal, and specifically includes: a processing unit 502 and a communication unit 503. The processing unit 502 is configured to control and manage actions of the terminal, for example, the processing unit 502 is configured to support the terminal in performing operations 202 and 203 in FIG. 2A and/or other processes of the technology described herein. The communication unit 503 is configured to support communication between the terminal and other devices. The terminal may further include a storage unit 501 configured to store program codes and data of the terminal.

The processing unit 502 may be a processor or a controller, such as a Central Processing Unit (CPU), a general purpose processor, a Digital Signal Processor (DSP), an Application-Specific Integrated Circuit (ASIC), a Field Programmable Gate Array (FPGA) or other programmable logic devices, transistor logic devices, hardware components, or any combination thereof. The processing unit 502 may implement or perform various exemplary logic boxes, modules, and circuits described in conjunction with contents of the present disclosure. The processor may also be a combination, such as a combination of one or more microprocessors, a combination of DSP and microprocessors, or the like, for implementing computing functions. The communication unit 503 may be a communication interface, a transceiver, a transceiver circuit, and the like, and the storage unit 501 may be a memory. When the processing unit 502 is the processor, the communication unit 503 is the communication interface, and the storage unit 501 is the memory, the terminal involved in the embodiments of the present disclosure may be the terminal shown in FIG. 3.

In a specific implementation, the processing unit 502 is configured to perform any of the steps performed by the terminal in the above method embodiments, and when performing data transmission such as sending the data, it selectively calls the communication unit 503 to complete corresponding operations. A detailed description will be given below.

The communication unit 503 is configured to receive at least one piece of clock information.

The processing unit 502 is configured to determine a specific cell according to the at least one piece of clock information.

The processing unit 502 is further configured to use the specific cell as a clock reference point, and perform clock synchronization according to the at least one piece of clock information.

In some embodiments, the specific cell is any one of the following: a primary cell, a primary secondary cell, any cell of a master node, any cell of a secondary node, or a cell that sends the clock information.

In some embodiments, the at least one piece of clock information is generated by the master node and/or secondary node.

In some embodiments, the at least one piece of clock information is sent by the primary cell and/or the primary secondary cell.

In some embodiments, with respect to determining the specific cell according to the at least one piece of clock information, the processing unit 502 is specifically configured to:

if first clock information sent by a first node is received, determine the specific cell according to the first clock information; and if the first clock information sent by the first node and second clock information sent by a second node are received, determine the specific cell according to the first clock information and the second clock information.

If the first node is the master node, the second node is the secondary node; and if the first node is the secondary node, the second node is the master node.

In some embodiments, with respect to determining the specific cell according to the first clock information, the processing unit 502 is specifically configured to:

if the first clock information is generated by the master node, determine that the specific cell is any one of the following: the primary cell, any cell of the master node, or a cell that sends the first clock information.

In some embodiments, with respect to determining the specific cell according to the first clock information, the processing unit 502 is specifically configured to:

if the first clock information is generated by the secondary node or corresponds to the secondary node, determine that the specific cell is the primary secondary cell or the cell that sends the first clock information.

In some embodiments, with respect to determining the specific cell according to the first clock information, the processing unit 502 is specifically configured to:

if the first clock information is generated by the secondary node or corresponds to the secondary node, determine that the specific cell is the primary secondary cell.

In some embodiments, with respect to determining the specific cell according to the first clock information, the processing unit 502 is specifically configured to:

if the first clock information is generated by the secondary node or corresponds to the secondary node, determine that the specific cell is the cell that sends the first clock information or the primary cell.

In some embodiments, with respect to determining the specific cell according to the first clock information, the processing unit 502 is specifically configured to:

if the first clock information is generated by the secondary node or corresponds to the secondary node, and is sent by a cell corresponding to the secondary node, determine that the specific cell is any one of the following: the primary secondary cell, any cell corresponding to the secondary node, or the cell that sends the first clock information.

In some embodiments, with respect to determining the specific cell according to the first clock information, the processing unit 502 is specifically configured to:

if the first clock information is generated by the secondary node or corresponds to the secondary node, and is sent by a cell corresponding to the master node, determine that the specific cell is the primary secondary cell or any cell corresponding to the secondary node.

In some embodiments, with respect to determining the specific cell according to the first clock information, the processing unit 502 is specifically configured to:

determine that the specific cell is the cell that sends the first clock information, or determine that the specific cell is a special cell corresponding to a node corresponding to the cell that sends the first clock information when the first clock information satisfies at least one of the following conditions:

the first clock information is generated by the secondary node or corresponds to the secondary node, and is sent by any cell corresponding to the master node;

the first clock information is generated by the secondary node or corresponds to the secondary node, and is sent by any cell corresponding to the secondary node;

the first clock information is generated by the master node or corresponds to the master node, and is sent by any cell corresponding to the master node; and the first clock information is generated by the master node or corresponds to the master node, and is sent by any cell corresponding to the secondary node.

In some embodiments, with respect to determining the specific cell according to the first clock information, the processing unit 502 is specifically configured to:

determine that the specific cell is the primary cell when the first clock information satisfies at least one of the following conditions:

the first clock information is generated by the secondary node or corresponds to the secondary node, and is sent by any cell corresponding to the master node;

the first clock information is generated by the secondary node or corresponds to the secondary node, and is sent by any cell corresponding to the secondary node;

the first clock information is generated by the master node or corresponds to the master node, and is sent by any cell corresponding to the master node; and the first clock information is generated by the master node or corresponds to the master node, and is sent by any cell corresponding to the secondary node.

In some embodiments, the communication unit 503 is further configured to receive first information, where the first information is used to indicate a position of the first clock information; and the processing unit 502 is further configured to determine that the first clock information is generated by the master node or corresponds to the master node according to the first information, or determine that the first clock information is generated by the secondary node or corresponds to the secondary node according to the first information.

In some embodiments, with respect to determining that the first clock information is generated by the master node or corresponds to the master node according to the first information, or the determining that the first clock information is generated by the secondary node or corresponds to the secondary node according to the first information, the processing unit 502 is specifically configured to:

if it is determined according to the first information that a position of the first clock information is within a container, determine that the first clock information is generated by the secondary node or corresponds to the secondary node;

otherwise, determine that the first clock information is generated by the master node or corresponds to the master node.

In some embodiments, with respect to determining the specific cell according to the first clock information, the processing unit 502 is specifically configured to:

receive network-indicated reference cell information, and the network-indicated reference cell information is used to indicate a cell corresponding to the first clock information; and determine the specific cell according to the cell corresponding to the first clock information.

In some embodiments, with respect to determining the specific cell according to the first clock information and the second clock information, the processing unit 502 is specifically configured to:

determine a first reference range of the specific cell according to the first clock information; and determining a second reference range of the specific cell according to the second clock information; and determine a same cell in the first reference range and the first reference range as the specific cell.

In some embodiments, with respect to receiving the at least one piece of clock information, the communication unit 503 is specifically configured to:

receive a system message or a dedicated radio resource control (RRC) message sent by a cell corresponding to the first node; and/or receive a system message or a dedicated radio resource control (RRC) message sent by a cell corresponding to the second node, where the system information includes the clock information, and the dedicated radio resource control (RRC) message includes the clock information.

In some embodiments, a type of the system information is any one of the following: a system information block (SIB) 1 or a system information block (SIB) 9.

In some embodiments, a type of the dedicated radio resource control (RRC) message is any one of the following: a signaling radio bear (SRB) 1 message, a signaling radio bear (SRB) 2 message, a signaling radio bear (SRB) 3 message or a downlink information transmission message.

In some embodiments, the first clock information includes at least one of the following information: reference clock information, a time, an uncertainty index, a time information type, and a reference system frame number.

Figure 6:
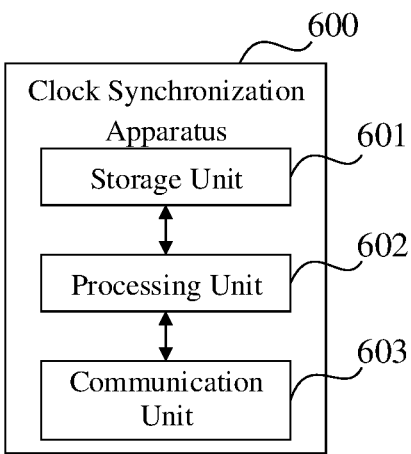
FIG. 6 is a block diagram of functional units of a clock synchronization apparatus provided by an embodiment of the present disclosure.

In a case where an integrated unit is adopted, FIG. 6 shows a possible block diagram of functional units of a clock synchronization apparatus involved in the above embodiments. The clock synchronization apparatus 600 is applied to a network device, and the network device includes: a processing unit 602 and a communication unit 603. The processing unit 602 is configured to control and manage actions of the network device, for example, the processing unit 502 is configured to support the network device in performing operations 202 and 204 in FIG. 2A and/or other processes of the technology described herein. The communication unit 603 is configured to support communication between the network device and other devices. The network device may further include a storage unit 601 configured to store program codes and data of the terminal.

The processing unit 602 may be a processor or a controller, such as a Central Processing Unit (CPU), a general purpose processor, a Digital Signal Processor (DSP), an Application-Specific Integrated Circuit (ASIC), a Field Programmable Gate Array (FPGA) or other programmable logic devices, transistor logic devices, hardware components, or any combination thereof. The processing unit 602 may implement or perform various exemplary logic boxes, modules, and circuits described in conjunction with contents of the present disclosure. The processor may also be a combination, such as a combination of one or more microprocessors, a combination of DSP and microprocessors, and the like, for implementing computing functions. The communication unit 603 may be a communication interface, a transceiver, a transceiver circuit, and the like, and the storage unit 601 may be a memory. When the processing unit 602 is the processor, the communication unit 603 is the communication interface, and the storage unit 601 is the memory, the terminal involved in the embodiments of the present disclosure may be the network device shown in FIG. 4.

The processing unit is configured to send first clock information to the terminal through the communication unit 603, and the first clock information is used by the terminal to perform the following operations: determining a specific cell according to the first clock information; and using the specific cell as a clock reference point and performing clock synchronization according to the first clock information.

In some embodiments, the network device is a first node in a Dual Connectivity (DC) network architecture, and the DC network architecture further includes a second node, and if the first node is a master node, the second node is a secondary node; and if the first node is the secondary node, the second node is the master node. The first clock information is further used by the terminal to perform the following operations: determining the specific cell according to the first clock information and second clock information sent by the second node to the terminal; and using the specific cell as the clock reference point, and performing the clock synchronization according to the first clock information and the second clock information.

In some embodiments, the first clock information is generated by the master node or the secondary node.

In some embodiments, the first clock information is sent by a primary cell or a primary secondary cell.

In some embodiments, with respect to sending the first clock information to the terminal, the communication unit 603 is specifically configured to:

send a system message to the terminal through a cell corresponding to the first node, where the system information includes the first clock information; or send a dedicated radio resource control (RRC) message to the terminal through the cell corresponding to the first node, where the dedicated radio resource control (RRC) message includes the first clock information.

In some embodiments, a type of the system information is any one of the following: a system information block (SIB) 1 or a system information block (SIB) 9.

In some embodiments, a type of the dedicated radio resource control (RRC) message is any one of the following: a signaling radio bear (SRB) 1 message, a signaling radio bear (SRB) 2 message, a signaling radio bear (SRB) 3 message or a downlink information transmission message.

In some embodiments, the communication unit 603 is further configured to:

send first information to the terminal, where the first information is used to indicate a position of the clock information; the first information is used by the terminal to perform the following operations: determining that the first clock information is generated by the master node or corresponds to the master node according to the first information, or determining that the clock information is generated by the secondary node or corresponds to the secondary node according to the first information.

In some embodiments, the communication unit 603 is further configured to:

send network-indicated reference cell information to the terminal, where the network-indicated reference cell information is used to indicate a cell corresponding to the first clock information, and indicate the terminal to perform the following operations: determining the specific cell according to the cell corresponding to the first clock information.

In some embodiments, the first clock information includes at least one of the following information: reference clock information, a time, an uncertainty index, a time information type, and a reference system frame number.

In some embodiments, the communication unit 603 is further configured to:

receive third clock information from the second node, modifying or updating the third clock information, and sending the modified or updated third clock information to the terminal, where the third clock information is used by the terminal to determine the specific cell and/or to perform the clock synchronization.

The embodiments of the present disclosure further provide a chip, and the chip includes a processor, configured to call and run a computer program from a memory, to cause a device installed with the chip to execute some or all of steps described with respect to the terminal in the above method embodiments.

The embodiments of the present disclosure further provide a computer readable storage medium, and the computer readable storage medium stores a computer program for electronic data exchange, and the computer program causes a computer to execute some or all of steps described with respect to the terminal in the above method embodiments.

The embodiments of the present disclosure further provide a computer readable storage medium, and the computer readable storage medium stores a computer program for electronic data exchange, and the computer program causes a computer to execute some or all of steps described with respect to the network side device in the above method embodiments.

The embodiments of the present disclosure further provide a computer program product, and the computer program product includes a computer program, and the computer program is operable to cause a computer to execute some or all of steps described with respect to the terminal in the above method embodiments. The computer program product may be a software installation package.

It can be seen that in the embodiments of the present disclosure, the terminal receives the at least one piece of clock information from the network device, determines the specific cell according to the at least one piece of clock information, and uses the specific cell as the clock reference point and performs the clock synchronization according to the at least one piece of clock information, so that a clock synchronization error caused by inconsistent understandings by the terminal and the network device with regard to the specific cell that serves as the clock reference point can be avoided, and the clock synchronization of the terminal and the network device is ensured.

The steps of the methods or the algorithms described in the embodiments of the present disclosure may be implemented by hardware or a processor executing software instructions. The software instructions may be composed of software modules that may be stored in a Random Access Memory (RAM), a flash memory, a Read Only Memory (ROM), an Erasable Programmable ROM (EPROM), an Electrically EPROM (EEPROM), a register, a hard disk, a removable hard disk, a Compact Disc-Read Only Memory (CD-ROM), or any other types of storage medium known in the art. An exemplary storage medium may be coupled to the processor such that the processor can read information from the storage medium and write information to the storage medium. The storage medium may also be a part of the processor. The processor and the storage medium may be arranged in an ASIC.

In addition, the ASIC may be arranged in an access network device, a target network device or a core network device. The processor and the storage media may also be arranged in the access network device, the target network device or the core network device.

Those skilled in the art should realize that in one or more examples described above, the functions described in implementations of the present disclosure may be implemented completely or partly by software, hardware, firmware, or any combination thereof. When the functions are implemented by software, these functions may be implemented completely or partly in the form of a computer program product. The computer program product includes one or more computer instructions. When the computer program instructions are loaded and executed on a computer, the processes or functions in accordance with the implementations of the present disclosure are generated completely or partly. The computer may be a general purpose computer, a special purpose computer, a computer network, or other programmable device. The computer instructions may be stored in a computer readable storage medium, or transmitted from one computer readable storage medium to another computer readable storage medium.

For example, the computer instructions may be transmitted from a website site, a computer, a server, or a data center to another website site, computer, server, or data center in a wired mode (e.g., in a coaxial cable, an optical fiber, a Digital Subscriber Line (DSL)) or a wireless mode (e.g., in infrared radiation, radio, microwave, etc.). The computer readable storage medium may be any available medium that the computer can access, or a data storage device such as an integrated server or data center that includes one or more available media. The available medium may be a magnetic medium (e.g., a floppy disk, a hard disk, a magnetic tape), an optical medium (e.g., a Digital Video Disc (DVD)), a semiconductor medium (e.g., a Solid State Disk (SSD)), or the like.

The objects, technical solutions, and beneficial effects of the present disclosure have been described in detail in the aforementioned specific embodiments. It should be understood that those described above are only specific embodiments of the present disclosure and are not intended to limit the protection scope of the embodiments of the present disclosure. Any modification, equivalent replacement or improvement made based on the technical solutions of the embodiments of the present disclosure shall fall within the protection scope of the present disclosure.

What is claimed is:

1. A method for clock synchronization, applied to a terminal connected to both a master node and a secondary node, the method comprising:
   receiving at least one piece of clock information, wherein the at least one piece of clock information comprises first clock information;
   determining by the terminal whether the first clock information is generated by the master node or by the secondary node, comprising: receiving, by the terminal, first information indicating a position of the first clock information, determining by the terminal that the first clock information is generated by the secondary node in a case where it is determined according to the first information that the position of the first clock information is within a container, and determining by the terminal that the first clock information is generated by the master node in a case where it is determined according to the first information that the first clock information is outside the container;
   in response to determining that the first clock information is generated by the master node, determining by the terminal that a primary cell of the master node is used as a clock reference point for clock synchronization with the master node;
   in response to determining that the first clock information is generated by the secondary node, determining by the terminal that a primary secondary cell of the secondary node is used as the clock reference point for the clock synchronization with the master node in a case where the first clock information is sent by the master node or sent by the secondary node; and
   based on the clock reference point, performing clock synchronization with the master node according to the first clock information,
   wherein the receiving the at least one piece of clock information comprises receiving a dedicated Radio Resource Control (RRC) message sent by a cell corresponding to the master node, and a type of the dedicated RRC message is a downlink information transmission message, and
   wherein each of the at least one piece of clock information comprises at least one of the following information: reference clock information, a time, an uncertainty index, a time information type, and a reference system frame number.

2. A terminal device, connected to both a master node and a secondary node, the terminal device comprising:
   a transceiver;
   a processor; and
   a memory configured to store a computer program executable by the processor,
   wherein the transceiver is configured to receive at least one piece of clock information, wherein the at least one piece of clock information comprises first clock information,
   the processor is configured to:
   determine whether the first clock information is generated by the master node or by the secondary node, comprising: receiving first information indicating a position of the first clock information, determining that the first clock information is generated by the secondary node in a case where it is determined according to the first information that the position of the first clock information is within a container, and determining that the first clock information is generated by the master node in a case where it is determined according to the first information that the first clock information is outside the container;
   in response to determining that the first clock information is generated by the master node, determine a primary cell of the master node is used as a clock reference point for clock synchronization with the master node;
   in response to determining that the first clock information is generated by the secondary node, determine that a primary secondary cell of the secondary node is used as the clock reference point for the clock synchronization with the master node in a case where the first clock information is sent by the master node or sent by the secondary node; and perform clock synchronization with the master node according to the first clock information based on the clock reference point, wherein the transceiver is configured to receive a dedicated Radio Resource Control (RRC) message sent by a cell corresponding to the master node, and a type of the dedicated RRC message is a downlink information transmission message, and wherein each of the at least one piece of clock information comprises at least one of the following information: reference clock information, a time, an uncertainty index, a time information type, and a reference system frame number.

3. A master node, wherein the master node is connected to a terminal and the terminal is connected to a secondary node, the master node comprising:

a transceiver;

a processor; and a memory configured to store a computer program executable by the processor, wherein the transceiver is configured to send first clock information to the terminal, wherein the first clock information is used by the terminal to perform the following operations:

determining whether the first clock information is generated by the master node or by the secondary node, comprising: receiving first information indicating a position of the first clock information, determining that the first clock information is generated by the secondary node in a case where it is determined according to the first information that the position of the first clock information is within a container, and determining that the first clock information is generated by the master node in a case where it is determined according to the first information that the first clock information is outside the container;

in response to determining that the first clock information is generated by the master node, determining that a primary cell of the master node is used as a clock reference point for clock synchronization with the master node;

in response to determining that the first clock information is generated by the secondary node, determining that a primary secondary cell of the secondary node is used as the clock reference point for the clock synchronization with the master node; and based on the clock reference point, performing clock synchronization with the master node according to the first clock information, wherein the transceiver is configured to send a dedicated Radio Resource Control (RRC) message to the terminal through the cell corresponding to the master node, and a type of the dedicated RRC message is a downlink information transmission message, and wherein each of the at least one piece of clock information comprises at least one of the following information: reference clock information, a time, an uncertainty index, a time information type, and a reference system frame number.

* * * * *